United States Patent [19]
Ushiyama et al.

[11] Patent Number: 5,091,067
[45] Date of Patent: Feb. 25, 1992

[54] METHOD AND AN APPARATUS FOR MACHINING OPTICAL COMPONENTS

[75] Inventors: Kazuo Ushiyama, Akishima; Masaki Watanabe, Hachiooji; Keiji Uchiyama, Tokorozawa; Hisayuki Takei, Hachiooji; Noriaki Takahashi; Akimi Matsuzawa, both of Ina; Kiyoshi Ooshiro, Nagano; Hajime Tamura, Fujinomachi, all of Japan

[73] Assignee: Olympus Optical Company Limited, Japan

[21] Appl. No.: 558,814

[22] Filed: Jul. 26, 1990

[30] Foreign Application Priority Data

Jul. 26, 1989 [JP] Japan .................................. 1-192842
Aug. 31, 1989 [JP] Japan .................................. 1-225767
Aug. 31, 1989 [JP] Japan .................................. 1-225769

[51] Int. Cl.$^5$ .......................... B23H 5/08; B23H 5/14
[52] U.S. Cl. ........................... 204/129.46; 204/129.5; 204/217; 204/224 M; 204/225
[58] Field of Search .............. 204/217, 224 M, 129.46, 204/219.75, 225

[56] References Cited

U.S. PATENT DOCUMENTS

| | | | |
|---|---|---|---|
| 3,161,576 | 12/1964 | Teichner | 204/129.46 |
| 3,293,162 | 12/1966 | Sullivan | 204/129.46 X |
| 3,669,867 | 6/1972 | Adachi | 204/224 M |
| 4,956,056 | 9/1990 | Zubatova et al. | 204/129.75 |

Primary Examiner—Donald R. Valentine
Attorney, Agent, or Firm—Bruce L. Adams; Van C. Wilks

[57] ABSTRACT

An apparatus and a method of machining optical components such as lens is disclosed. The apparatus comprises an optical raw stock or material, a rotatable holding shaft for holding the optical raw stock, a machining tool having a machining surface thereof held by a rotatable machining shaft and arranged opposite to a surface to be machined of the optical raw stock, an electrically conductive tool as the machining tool, an electrode arranged at a certain distance from the machining surface of the conductive tool, an electrolytic power supply source for applying a positive voltage to the conductive tool and a negative voltage therefrom to the electrode, respectively, and a coolant supplying unit having a nozzle and for spraying weakly conductive coolant between the conductive tool and the electrode, thereby performing the machining of the optical raw stock or material.

16 Claims, 18 Drawing Sheets

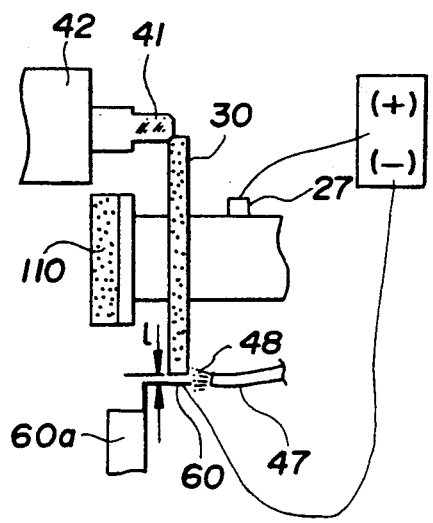
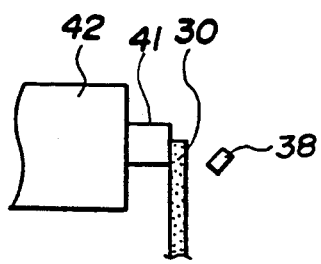
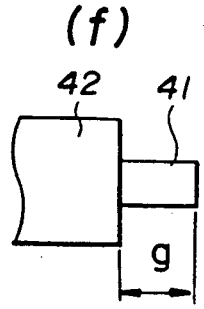
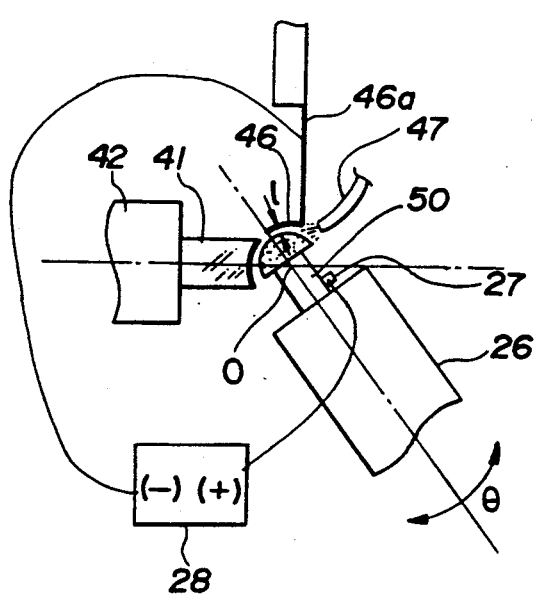
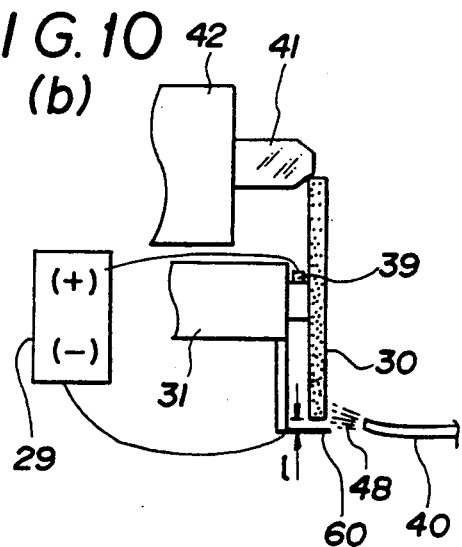
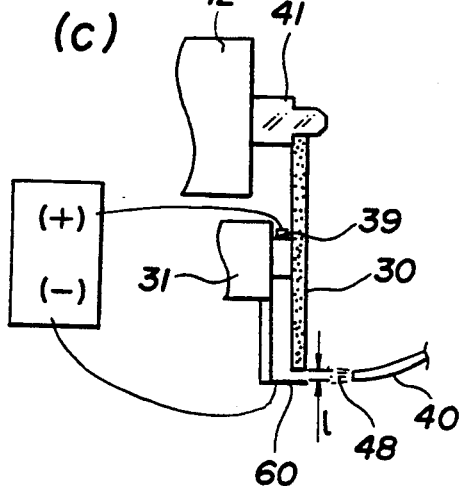

METHOD AND AN APPARATUS FOR MACHINING OPTICAL COMPONENTS

BACKGROUND OF THE INVENTION

The present invention relates to a method of machining optical components such as surface generating with the use of a machining tool such as grinding wheel, more particularly, a method of machining optical components by a grinding with electrolytic inprocess dressing, and an apparatus for carrying out such a method.

The grinding with electrolytic inprocess dressing for performing surface machining with the use of grinding wheel is well known. For example, such a grinding is disclosed in Transactions of the Japan Society of Precision Engineering, Autumn, 1988, and Transactions of the Japan Society of Precision Engineering, Spring, 1989.

Such a grinding method disclosed in the above articles are explained in FIGS. 14a and 14b.

FIG. 14a shows a principle of grinding with electrolytic inprocess dressing and FIG. 14b is a right side view showing a part of FIG. 14b.

As shown in FIG. 14a, the grinding with electrolytic inprocess dressing comprises an electrolytic dressing power supply source 230, a lead wire 236 connected to an anode electrode (+) of the supply source 230, a supplying brush 231 and a rotatable disc grinding wheel 232 in contact with the tip portion of the brush 231.

The grinding with electrolytic inprocess dressing further comprises a lead wire 237 connected to a cathode electrode (−) of the supply source 230, a counter electrode 233 connected to the lead wire 237 at a certain distance to a grinding surface of the grinding wheel 232, and a nozzle 234 arranged between the grinding wheel 232 and the negative electrode 233 and for spraying weakly conductive coolant, thereby obtaining inprocess dressing effect resulting in a dressing by the grinding wheel 232 during machining of silicon ingot (work) 235.

In the above method, the position of the electrode 233 is always fixed with respect to the shaft of the grinding wheel 232 to hold a slight gap (0.1~0.2 m/m) between the electrode 233 and the grinding surface of the wheel 232 constant. The grinding is performed at the position that the electrode 233 and the work 235 loaded in a chuck which is held in a turning center 238, are not subjected to an interference effect with each other. Reference numeral 239 is a supply nozzle for machining coolant.

In case of performing the machining, such as roughing, polishing, centering and edging which are required to the machining of optical components in the above conventional machining method, respective machining steps must be performed by respective units, for example, even in roughing polish steps, respective machining units are necessary for respective steps, such as tentering, rounding, chamfering, fine lapping and polishing, so that production efficiency becomes very poor. Moreover, in the optical components having a plurality of diameters for each diameter the, collet chuck holding the optical components must be interchanged, so that machining process becomes very inefficient and thus it takes too much time to carry out the machining.

Moreover, in grinding with electrolytic inprocess dressing to obtain the inprocess dressing, the work and the electrode must be arranged in such a manner that these work and electrode are not subjected to a interference effect with each other.

SUMMARY OF THE INVENTION

It is an object of the present invention to resolve the above problems of the conventional method of machining optical components.

It is another object of the present invention to provide a method of and an apparatus for machining optical compoments, by which the machining of a plurality kinds of optical components is performed with efficiency while effectively obtaining the advantages of grinding with electrolytic inprocess dressing.

According to the present invention, there is provided a method of machining optical components comprising steps of: providing an optical raw stock or material; holding the optical raw stock by a rotatable holding shaft; and machining the optical raw stock with the use of a machining tool having a machining surface thereof held by a rotatable machining shaft and arranged opposite to a surface to be machined of the optical raw stock; the improvement comprising steps of: providing an electrically conductive tool as the machining tool; arranging an electrode at a certain distance from the machining surface of the conductive tool; applying a positive voltage from an electrolytic supply source to the conductive tool and a negative voltage therefrom to the electrode, respectively; and applying weakly conductive coolant between the conductive tool and the electrode, thereby performing the machining of the raw stock or material.

A method of machining optical components comprises steps of: providing an optical raw stock or material; holding the optical raw stock by a rotatable holding shaft; and machining the optical raw stock with the use of a machining tool having a maching surface thereof held by a rotatable machining shaft and arranged oposite to a surface to be machined of the optical raw stock; the improvement comprising steps of: providing a plurality of electrically conductive tools required to the machining of the raw stock as the machining tool; arranging a plurality of electrodes at a certaine distance from the maching surfaces of the respective conductive tools, respectively, the number of the electrodes corresponding to the number of the conductive tools; applying positive voltages from an electrolytic supply source to the respective conductive tools and negative voltages therefrom to the respective electrodes, respectively; and applying weakly conductive coolant between the respective conductive tools and the respective electrodes, thereby continuously performing a plurality of kinds of machining of the optical raw stock.

The plurality of kinds of machining are edging, curve generating or surface grinding, curve or surface polishing, chamfering grinding and cutting.

A method of machining optical components comprises steps of: providing an optical raw stock or material; holding the optical raw stock by a first rotatable holding shaft; machining one surface to be machined of the optical raw stock with the use of a first machining tool having a machining surface thereof held by a first rotatable machining shaft and arranged opposite to the surface to be machined of the optical raw stock; holding the machined surface portion of the optical raw stock by a second rotatable holding shaft; cutting the optical raw stock at an opposite side to the machined surface of the stock; and machining the cut surface of the stock with the use of a second machining tool having a machining surface thereof held by a second rotatable machining shaft and arranged opposite to the cut surface of the stock; the improvement comprising step of: providing electrically conductive tools as the machining tools of respective machining shafts, respectively; arranging electrodes at a certain distance from the machining surface of respective conductive tools, respectively; applying positive voltages from an electrolytic supply source to the respective conductive tools and negative voltages therefrom to the respective electrodes, respectively; and applying weakly conductive coolant between the respective conductive tools and the respective electrodes, thereby continuously performing a plurality of kinds of machining of the optical raw stock.

The plurality of kinds of machining are curve generating or surface grinding, curve or surface polishing, chamfering grinding and centering and edging grinding.

An apparatus for machining optical components comprises an optical raw stock or material, a rotatable holding shaft for holding the optical raw stock, a machining tool having a machining surface thereof held by a rotatable machining shaft and arranged oposite to a surface to be machined of the optical raw stock, characterized by comprising an electrically conductive tool as the machining tool, an electrode arranged at a certain distance from the machining surface of the conductive tool, an electrolytic power supply source for applying a positive voltage to the conductive tool and a negative voltage therefrom to the electrode, respectively, and a coolant supplying unit having a nozzle and for spraying weakly conductive coolant between the conductive tool and the electrode, thereby performing the machining of the optical raw stock or material.

An apparatus for machining optical components comprises an optical raw stock or material, a rotatable holding shaft for holding the optical raw stock, a machining tool having a machining surface thereof held by a rotatable machining shaft and arranged oposite to a surface to be machined of the optical raw stock, characterized by comprising an electrically conductive tool as the machining tool, a plurality of electrically conductive tools required to the machining of the raw stock as the machining tool, a plurality of electrodes arranged at a certain distance from the machining surfaces of the respective conductive tools, respectively, the number of the electrodes corresponding to the number of the conductive tools, an electrolytic power supply source for applying positive voltages to the respective conductive tools and negative voltages therefrom to the respective electrodes, respectively, and a coolant supplying unit for spraying weakly conductive coolant between the respective conductive tools and the respective electrodes, thereby continuously performing a plurality of kinds of machining of the optical raw stock.

The plurality of kinds of the machining are of edging, curve generating or surface grinding, curve or surface polishing, chamfering grinding and cutting.

An apparatus for machining optical components comprises an optical raw stock or material, a first rotatable holding shaft for holding the optical raw stock by a first rotatable holding shaft, a first machining tool having a machining surface thereof held by a first rotatable machining shaft and arranged opposite to the surface to be machined of the optical raw stock and for machining one surface to be machined of the optical raw stock, a second rotatable holding shaft for holding the machined surface portion of the optical raw stock, means for cutting the optical raw stock at an opposite side to the machined surface of the stock, a second machining tool having a machining surface thereof held by a second rotatable machining shaft and arranged opposite to the cut surface of the optical raw stock and for machining the cut surface of the stock, characterized by comprising electrically conductive tools as the machining tools of respective machining shafts, respectively, electrodes arranged at a certain distance from the machining surface of respective conductive tools, respectively, an electrolytic power supply source for supplying positive voltages to the respective conductive tools and negative voltages therefrom to the respective electrodes, respectively, and a coolant supplying unit for supplying weakly conductive coolant between the respective conductive tools and the respective electrodes, thereby continuously performing a plurality kinds of the machining of the optical raw stock.

The plurality of kinds of machining are curve generating or surface grinding, curve or surface polishing, chamfering grinding and centering and edging grinding.

BRIEF DESCRIPTION OF THE DRAWINGS

FIGS. 8a to 8f are enlarged fragmentary side views showing the essential portion of an eighth embodiment of the method according to the present invention;

FIGS. 10a to 10h are enlarged fragmentary side views showing the essential portion of the method shown in FIG. 9;

FIG. 14a is a side view showing a construction of a conventional method of curve generating grinding; and FIG. 14b is a plan view showing the work and the grinding wheel shown in FIG. 14a.

DETAILED EXPLANATION OF THE PREFERRED EMBODIMENT

Figure 1A:
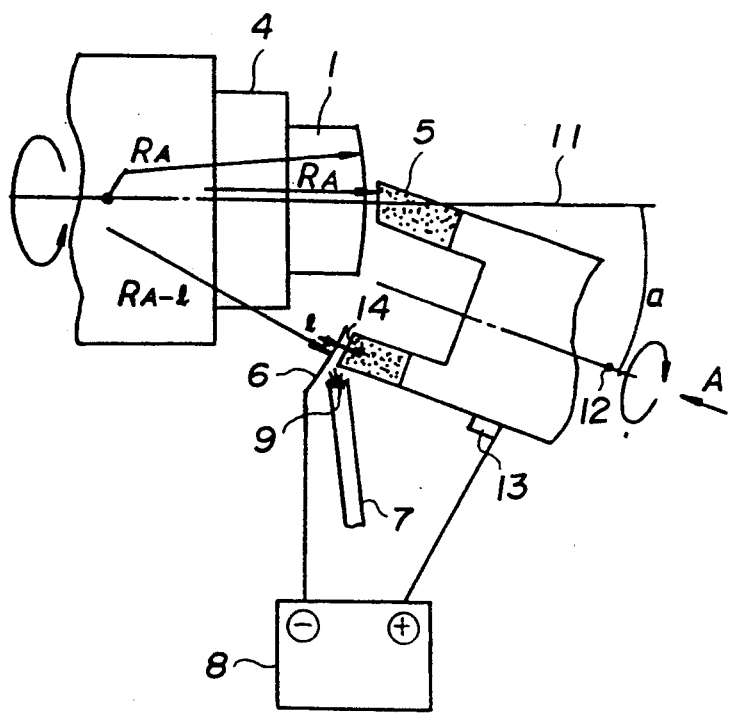
FIG. 1a is a side view showing the essential portion of a first embodiment of a method of machining optical components according to the present invention.

Now, referring to the drawings, there is shown one embodiment of a method of machining optical components according to the present invention.

FIRST EMBODIMENT

Figure 1B:
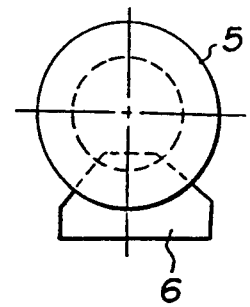
FIG. 1b is a plan view showing a conductive tool and an electrode of FIG. 1a in the direction of an arrow A.

As shown in FIGS. 1a and 1b, in a method of machining optical components according to the present invention, an optical raw stock or material 1 is rotatably held by a rotatable chuck 4 and a cup-shaped conductive grinding tool 5 is arranged at a swivel angle $\alpha$ with respect to a shaft center 11 of the optical raw stock and held rotatably by a rotary shaft 12.

The optical raw stock 1 is also arranged opposite to a grinding surface 14 of the conductive grinding tool 5 so as to generate a curved surface with a given curvature RA. To this end, the grinding surface 14 of the conductive grinding tool 5 has a shape of curvature similar to the curvature RA of the optical raw stock 1 to be ground, so that the grinding surface 14 is made in contact with an end surface to be ground of the raw stock 1 thereby grinding the raw stock 1 in accordance with a given notching path. The grinding surface 14 of the conductive grinding tool 5 is made of an alloy by sintering abrasive grain such as diamond powder and metal powder such as Cu, Sn, Fe or the like, which are specially mixed and subjected to a heat treatment.

An electrolytic power supply source 8 is externally provided, the position terminal of which is connected to the conductive grinding tool 5 through a lead wire and a voltage supplying or feeding brush 13. A negative terminal of the electrolytic supply source 8 is connected to an electrode 6 having a shape of curvature RA-1 similar to the machining curvature RA of the optical raw stock 1 through a lead wire. This electrode 6 is also arranged opposite to the grinding surface 14 at slight intervals l. A nozzle 7 of a coolant supply unit (not shown) is arranged near the intervals l between the grinding surface 14 of the conductive tool 5 and the electrode 6 so as to spray weakly conductive coolant 9 therebetween, so that the grinding surface 14 is subjected to a dressing with electrolytic effect of the coolant 9 together with the applied voltage.

The curve generating machining method according to the present invention is carried out by the above construction as follows.

Firstly, the optical raw stock 1 is loaded to a chuck 4 which is then rotated. At the same time, the conductive grinding tool 5 is also swung, so that the grinding surface 14 provided to the end portion of the tool 5 comes in contact with an end surface to be ground of the optical raw stock 1, thereby performing the grinding thereof. At the same time, the position (anode) voltage from the electrolytic supply source 8 is applied to the conductive tool 5 through the brush 13 and the negative (cathode) voltage from the supply source 8 is applied to the electrode 6 which is arranged opposite to the grinding surface 14 of the conductive tool 5 at small intervals l. When the grinding is performed while spraying the weakly conductive coolant 9 between the electrode 6 and the grinding surface 14 of the conductive tool 5 from the nozzle 7 arranged therebetween, the weakly conductive coolant 9 is present between the electrode 6 and the grinding surface 14, so that the intervention of the coolant 9 together with application of voltage dresses the grinding surface 14 by electrolytic effect, and thus a deviation of abrasive is not caused on the grinding surface 14 of the conduction tool 5, thereby preventing a formation of projection (navel) at the center of the optical raw stock 1 and obtaining a constant gap l along the curvature thereof. The grinding surface 14 of the conductive tool 5 may therefore be dressed uniformly and stable grinding of curve generating may also be performed.

SECOND EMBODIMENT

Figure 2:
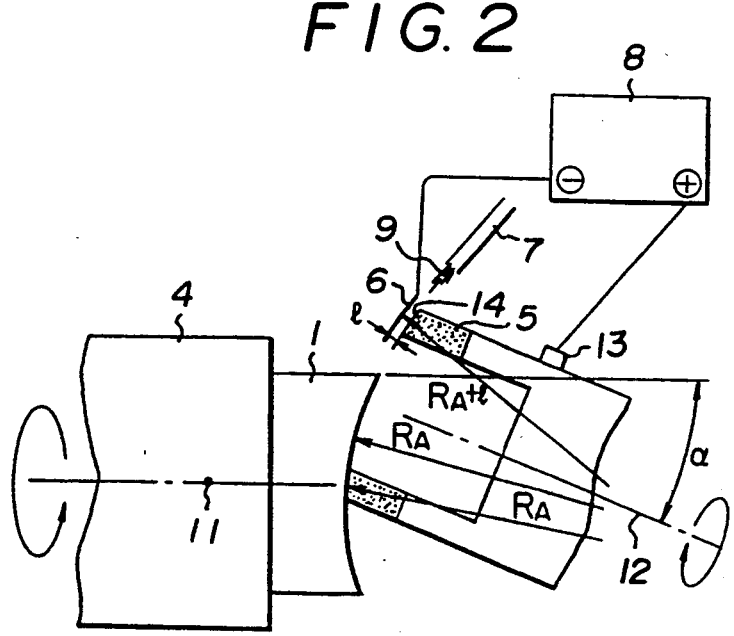
FIG. 2 is a side view showing the essential portion of a second embodiment of the method according to the present invention.

FIG. 2 shows second embodiment of the method according to the present invention.

In FIG. 2, parts similar to those previously described with reference to FIG. 1 are denoted by the same reference numerals and its explanation is omitted.

As shown in FIG. 2, in this embodiment, a cup-shaped conductive grinding tool 5 is secured on a rotatable shaft 12 which is arranged at swivel angle $\alpha$ a relative to rotatable shaft 11 of the optical raw stock 1. The optical raw stock 1 is loaded on the rotatable chuck 4 so as to subject the end face of the optical stock 1 to the curve generating of curvature RA.

To this end, the rotatable conductive grinding tool 5 having the grinding surface 14 which is formed in the same shape as the curvature RA of the stock 1 is made in contact with the end face of the stock 1 while rotating and moving the tool 5 in accordance with the notching path, thereby performing curve generating of the stock 1.

In this case, the pulse voltage generated from the electrolytic power supply source 8 is applied to the conductive grinding tool 5 through the feeding brush 13 as an anode voltage, and the cathode voltage is applied to an electrode 6 which has a shape of curvature RA+1 similar to the curvature RA of the grinding surface 14 of the conductive tool 5. The small gap l (0.1~0.2 mm) is maintained between the grinding surface 14 having curvature RA of the conductive tool 5 and the electrode 6 having a shape of curvature RA+1.

The nozzle 7 of the coolant supplying source is arranged near the gap l so as to spray weakly conductive coolant 9.

The operation of the apparatus for machining optical components based on the method according to the present invention is described as follows. The grinding surface 14 of the conductive tool 5 is made in contact with the rotating optical raw stock 1 and the coolant 9 from the nozzle 7 is sprayed in the gap l formed between the electrode 6 and the grinding surface 14. The voltage applied to the positive electrode 13 of the conductive tool 5 interposes the weakly conductive coolant 9 in the gap l uniformly so that the grinding surface 14 of the conductive tool 5 is dressed by electrolytic effect. The above grinding of the machining method may be made with a small deviation of the grinding surface 14, whereby the projection (navel) 2 is prevented from being caused on the rotary center of the optical raw stock 1. When the grinding surface 14 is made constant in shape, the negative electrode 6 may be always maintained at constant intervals opposite to the grinding surface 14, so that the grinding surface 14 may always be constantly and uniformly dressed and thus stable curve generating may be performed.

THIRD EMBODIMENT

A third embodiment of the method according to the present invention is explained with reference to FIGS. 3a, 3b and 3c, in which parts similar to those previously described with reference to FIGS. 1 and 2 are designated by the same references numerals and its explanation is omitted.

Figure 3A:
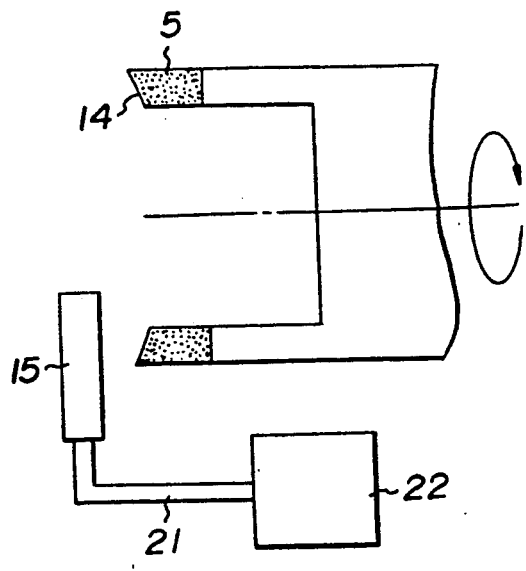
FIGS. 3a to 3c are enlarged fragmentary side views showing the essential portion of a third embodiment of the method according to the present invention.
Figure 3B:
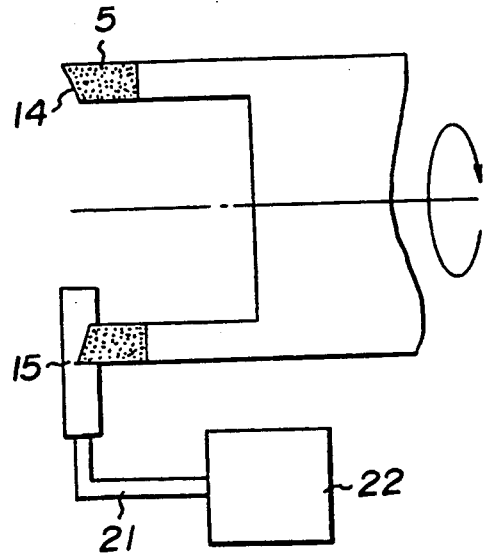
Figure 3C:
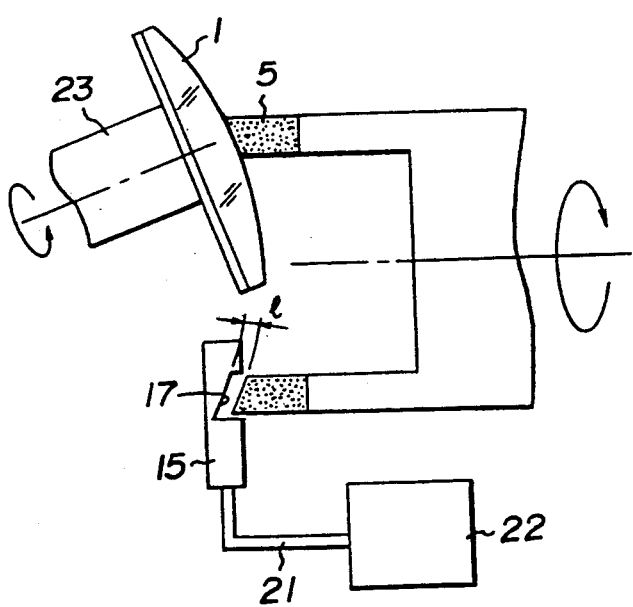

As shown in FIGS. 3a, 3b and 3c, a rectangular electrode blank 15 is arranged opposite to the grinding surface 14 of the conductive tool 5 and made in contact with the grinding surface 14 of the tool 5, so that as shown in FIG. 3b, the blank is formed in the same shape as the grinding surface 14 and thus as shown in FIG. 3c, the blank 15 is subjected to a notching grinding to obtain the same shape as that of the grinding 14. The electrode blank 15 thus formed is, during grinding of the stock 1 rotatably held by a rotary shaft 23, maintained a slight gap 1 between the grinding surface 14 and a surface formed in the same shape as that of the negative electrode blank 15, thereby performing the grinding of the optical raw stock 1.

In FIG. 3, reference numeral 22 is an electrode drive unit and numeral 21 is its rod. The construction other than the above construction is the same as that of the first and second embodiments so that its explanation is omitted. The grinding of the optical raw stock 1 according to the above construction is performed as follows. The machined surface 17 of negative electrode blank 15 is arranged in the gap 1 opposite to the tip grinding surface 14 of the conductive tool 5 in completely coincident manner, and then the coolant 9 is sprayed in the gap 1 from the nozzle 7, so that the coolant 9 intervenes in the gap constantly, thereby performing the dressing for the grinding surface 14 uniformly.

In this embodiment, also, the negative electrode blank 15 may be made movable by the drive unit 22 through the rod 21.

FOURTH EMBODIMENT

The fourth embodiment of the method according to the present invention is explained with reference to FIGS. 4a, 4b and 4c, in which parts similar to those previously described with reference to the components shown in FIGS. 2 and 3 are designated by the same reference numerals and an explanation thereof is omitted.

Figure 4A:
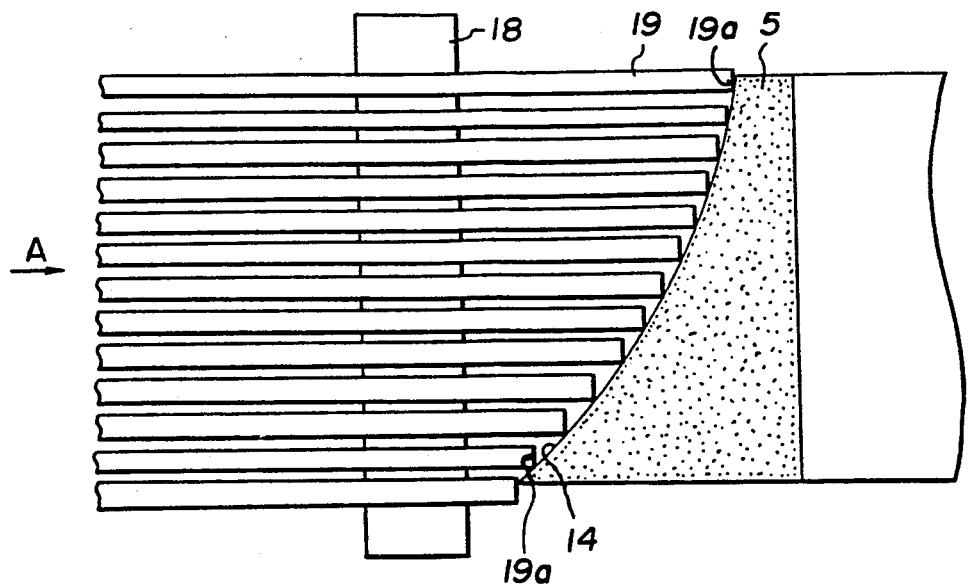
FIGS. 4a and 4b are enlarged fragmentary side views showing the electrode portion of a fourth embodiment of the method according to the present invention.
Figure 4B:
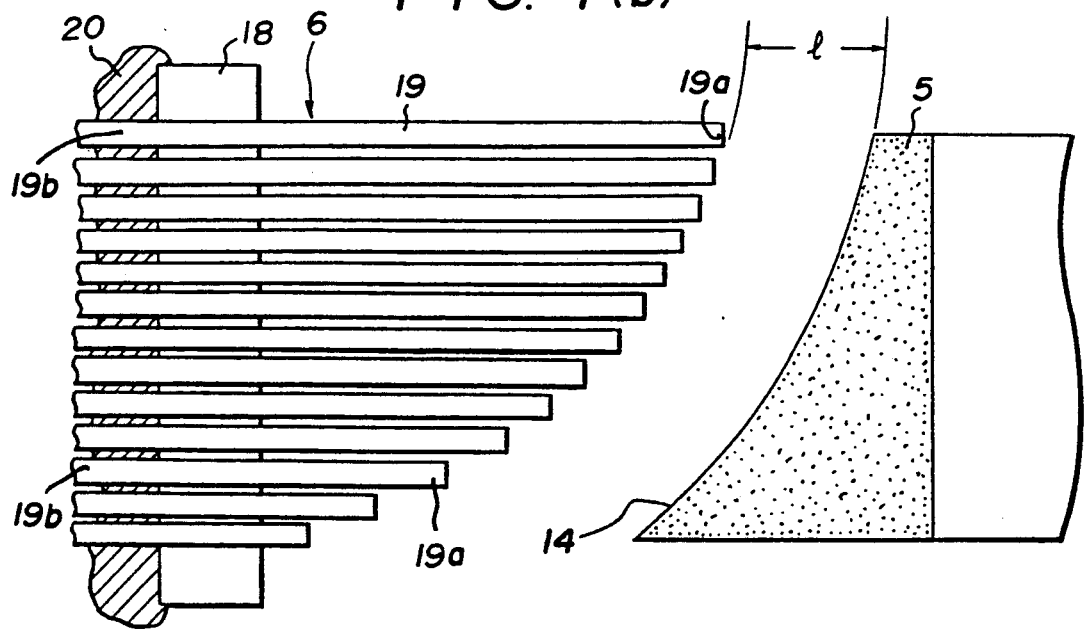
Figure 4C:
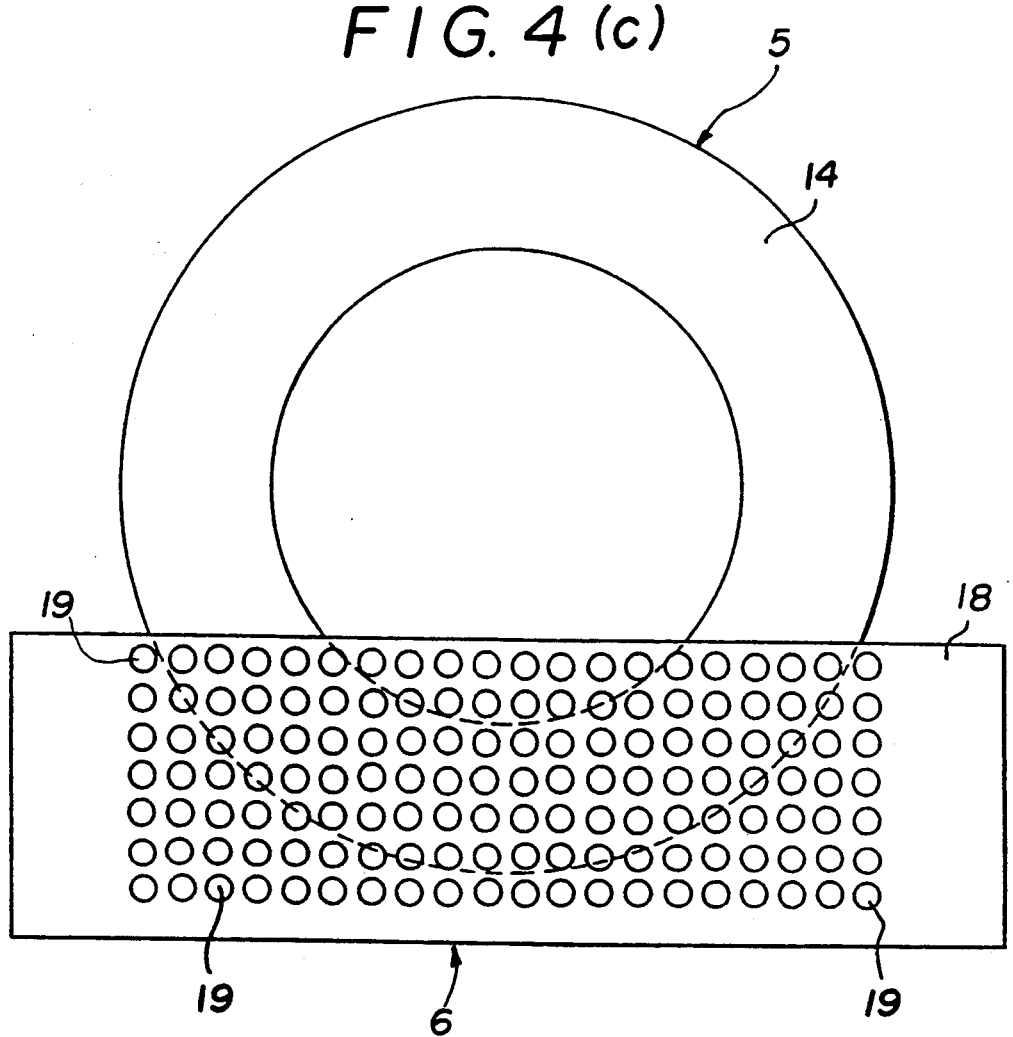
FIG. 4c is a plan view of FIG. 4a in the direction of an arrow A.

FIG. 4a shows the essential portion of the electrode of the method of machining optical components according to the present invention. FIG. 4b shows machining of the electrode and FIG. 4c shows the electrode in the direction of an arrow A shown in FIG. 4a.

As shown in FIG. 4a, in this embodiment, the electrode 6 shown in the first embodiment comprises a plurality of electrode rods 19 (in FIG. 4c, small number of the electrode rods 19 are shown), and a plurality of small rod shaped cathode electrodes 19 are secured to an electrode housing 18 so as to movably hold them in its the axial direction so that in order to make its shape same as that of the grinding surface 14, the tip end portion 19a of the respective electrode rod 19 is made in contact with the grinding surface 14 (see, FIG. 4a). As shown in FIG. 4b, the other tip end portion 19b of the respective electrode 19 is secured to the electrode housing 18 with adhesive 20, and then to form a small gap 1 between the tip portion 19b of respective electrodes 19 and the grinding surface 14 of the conductive tool 5, and the weakly conductive coolant 9 is sprayed in the gap 1 from the coolant supply source, thereby machining or grinding the stock 1.

The operation other than the described operation is the same as that of the above embodiments, so that its explanation is omitted.

According to this embodiment, a constant electrolytic conditions may always be obtained and uniform dressing may be carried out.

FIFTH EMBODIMENT

Figure 5A:
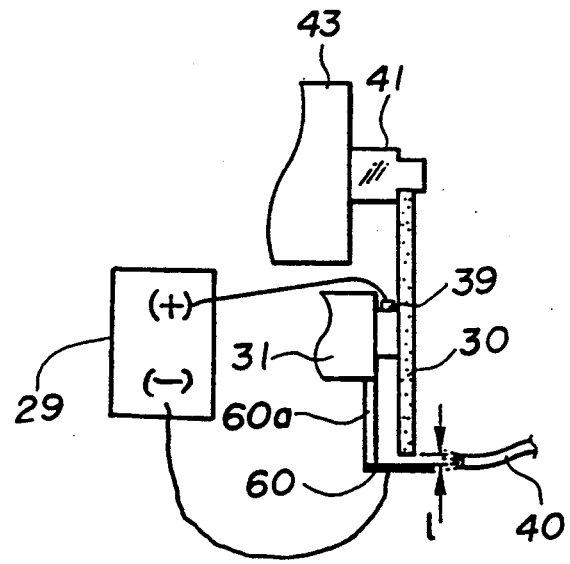
FIGS. 5a and 5c to 5g are enlarged fragmentary side view showing the essential portion of a fifth embodiment of the method according to the present invention.
Figure 5B:
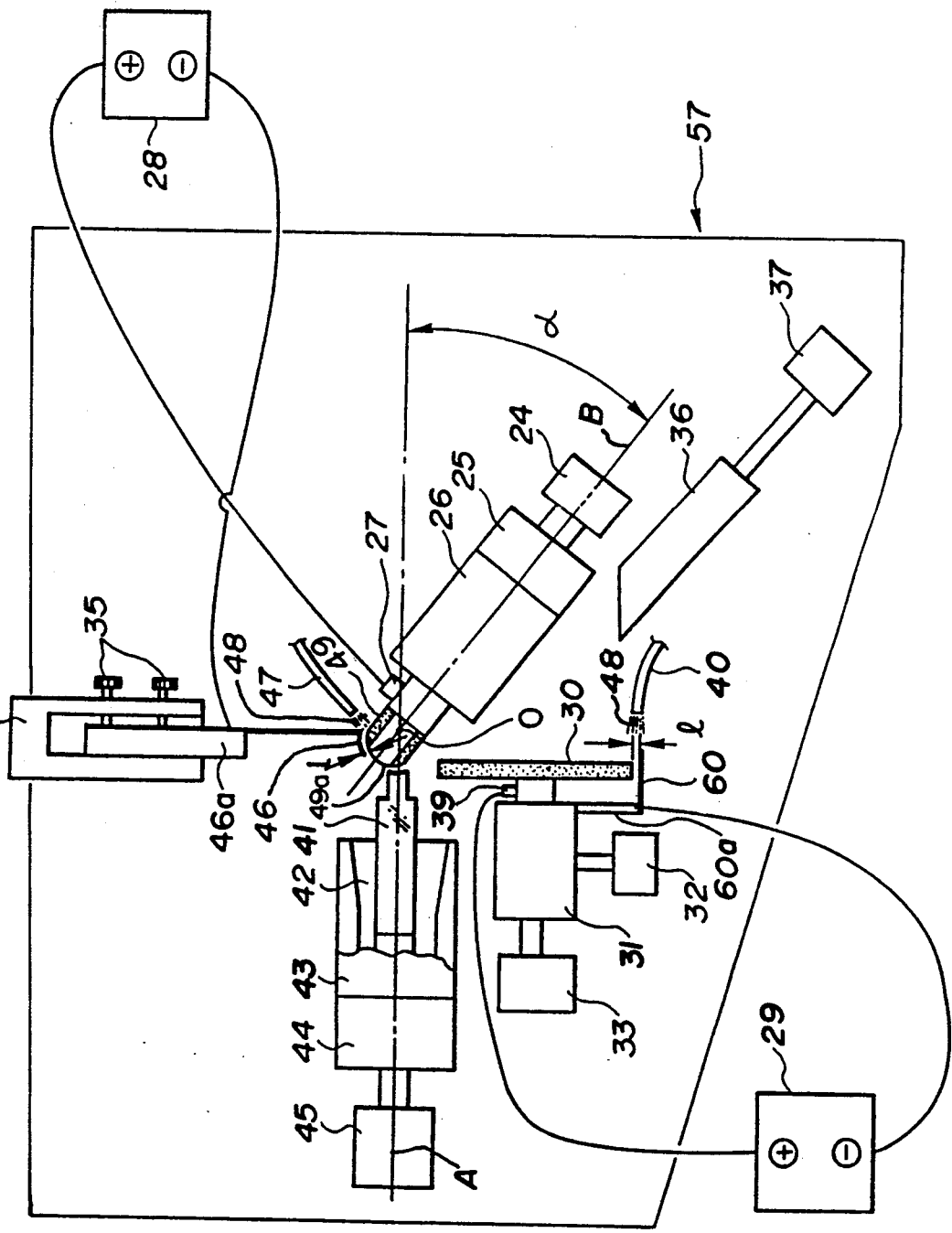
FIG. 5b is a plan view showing an apparatus carrying out the method shown in FIGS. 5a and 5c to 5g.

The fifth embodiment of the method according to the present invention is described with reference to FIG. 5a to 5b. FIG. 5b shows an apparatus for machining optical components which carries out the method according to the present invention. FIG. 5a and 5c to 5g show the method according to the present invention. FIG. 5h show an effective electrode and the dressing effect of the conductive straight grinding wheel.

As shown in FIG. 5b, a rod-shaped glass stock 41 as an optical raw material is held by a collet chuck 42 with respect to a spindle 43 which is held rotatably by a motor 44 and movably about a holding shaft A by a servo motor 43.

The apparatus for machining optical components further comprises a machining shaft B for detachably holding a conductive curve generating (CG) grinding wheel 49 and a conductive grinding wheel 50 opposite to the holding shaft, a lens receptacle 36 movably arranged through a holding shaft c of a straight grinding wheel 30 and a cylinder 37, and an electrode 46 arranged to form gap 1 between the machining surface of the conductive CG grinding wheel 49 or the conductive grinding wheel 50 and the electrode 46 which is provided on a base 27 of the grinder.

The machining shaft B of the conductive CG grinding wheel 49 and the conductive grinding wheel 50 is constructed by loading a spindle 26 and a rotating drive motor 25 on the operating shaft of the servo motor 24, and a swivel angle (a; not shown) control section portion holds the conductive CG grinding wheel 49 and the conductive grinding wheel 50 at any position, thereby machining the stock 41.

The electrode 46 is held by a holder 34 with adjustment by a screw 35 with a desired gap 1 between machining surfaces 49a, 50a (which made the surface of the stock 41 concave of the conductive CG grinding wheel 49 and the conductive grinding wheel 50 through a holding arm 46a, and a positive or anode voltage from the electrolytic supply source 29 is applied to the conductive CG grinding wheel 49 and the conductive grinding wheel 50 through the feeding brush 27 and the negative or cathode voltage from the electrolytic supply source 29 is applied to the electrode 46. Additionally, the weakly conductive coolant 48 is supplied between the conductive CG grinding wheel 49 and the conductive grinding wheel 50 from the feed pipe 47, thereby machining the stock 41 while performing the electrolytic dressing. The electrode 46 has a shape corresponding to that of machining surfaces 49a and 50a of the grinding wheels 49 and 50.

A conductive straight wheel 30 is held to the drive shaft of the rotating drive motor 31 and the rotating drive motor 31 is held by servo motors 32 and 33 which operate or move in the orthogonal direction with each other, and is held movably in parallel with and in orthogonal directions to the holding shaft A of the optical raw stock or material 41. As is not shown in FIG. 4, the movement of the rotatable drive motor 31 by the servo motors 32 and 33 is so constructed that the servo motors 32 and 33 may be operated without interfering with each other. For example, the motor 31 is placed on one of XY tables and this table is moved to the other of XY tables by the servo motor 32, and the other table is moved in the other direction by the servo motor 33.

The electrode 60 is provided to the rotating drive motor 31 through the holding arm 60a with a gap l between the machining surfaces of the straight grinding wheel 30 and electrode 60. The anode voltage of the electrolytic supply source 29 is applied to the straight grinding wheel 30 through the feeding brush 39. The cathode voltage is applied to the electrode 60 and weakly conductive coolant 48 is sprayed between the electrode 60 and the machining surface of the straight wheel 30 through the pipe 40, so that the electrolytic dressing may be performed during machining of the optical glass raw stock 41 due to the straight grinding wheel 30.

In the apparatus for machining optical components described above, as shown in FIG. 5a, the glass stock 41 is movably and rotatably held by the servo motor 45 and the spindle 43 is subjected to the rounding grinding by the straight wheel 30. In this case, the control of machining position of the glass stock 41 and the grinding wheel 30 is effected by servo motors 45, 32 and 33, and the machining control of the rounding diameter is effected by the control of the servo motor 32 and 33. During machining, the electrolytic dressing is performed by the above construction so that the machining surface of the straight grinding wheel 30 may be maintained as the desired machining surface.

With respect to the evacuation of the straight grinding wheel 30 from the machining position, then, the conductive CG wheel 49 is made fowarded by the servo motor 24 to the machining position of the rounding grinding, thereby machining the glass stock while controlling the wheel 49 by the swivel angle ($\alpha$) control portion (see FIG. 5b). Even during grinding by the conductive CG grinding wheel 49, the machining surface 49a of the CG grinding wheel 49 may be subjected to the electrolytic dressing and the required curvature of the machining surface 49a may be maintained suitably.

Figure 5C:
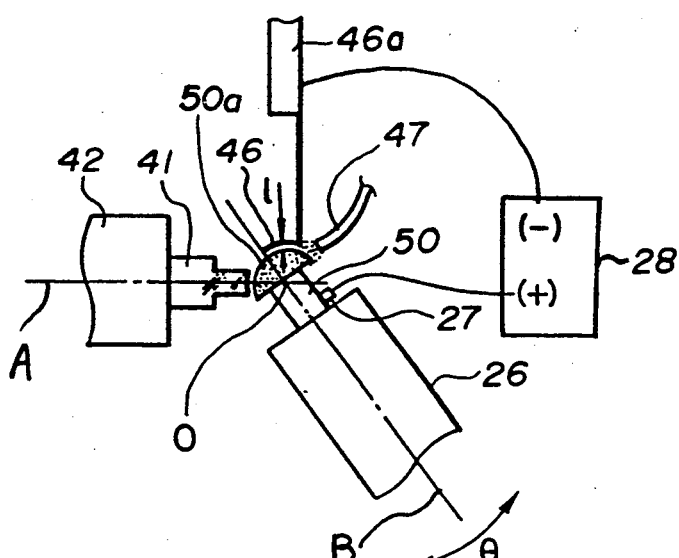
Figure 5D:
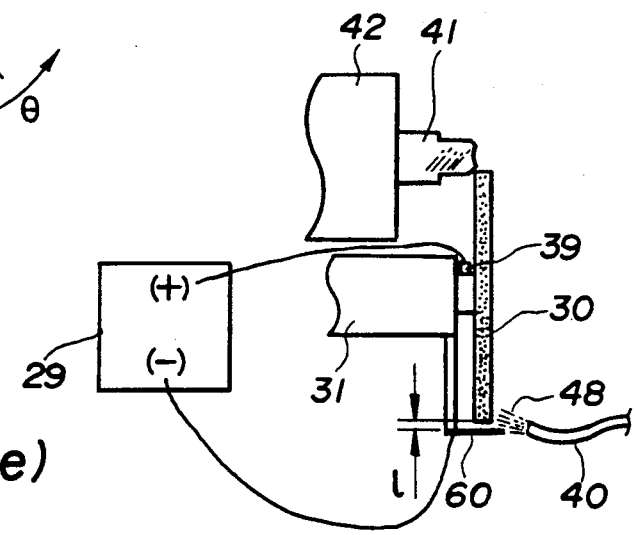

As shown in FIG. 5c, the conductive CG grinding wheel 49 held by the spindle 26 in FIG. 5b, is removed and the conductive grinding wheel 50 is loaded, so that the swing motion is added in the range of $\theta$ about the swinging center 0 shown in FIG. 5c, through the swivel angle ($\alpha$), thereby effecting the grinding of the stock. Even in this machining, the machining surface of the conductive grinding wheel 50 through the swivel angle ($\alpha$) control section, and required curvature is maintained, so that the grinding of the glass stock 41 may be effected suitably and fairly.

The servo motor 24 is made operated. Then, the evacuation of the grinding wheel 50 is effected from the machining position and then the servo motors 32 and 33 are again operated so that the straight grinding wheel 30 may be maintained at the machining position and then the chamfering of the glass stock 41 is effected (see FIG. 5b).

Figure 5E:
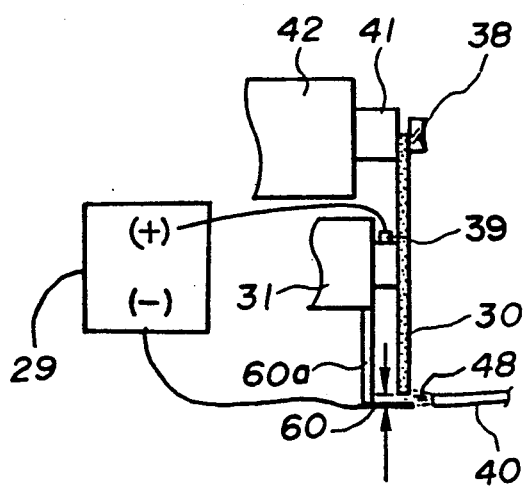
Figure 5F:
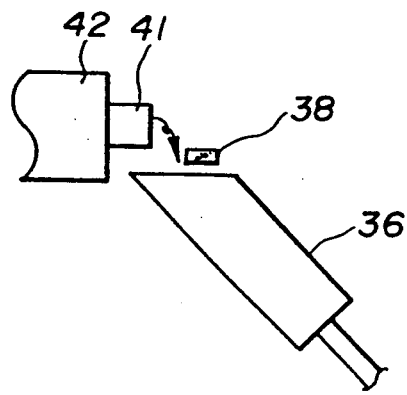

As shown in FIG. 5e, then, with respect to effecting of high speed cutting effected by the straight grinding wheel 30 while effecting electrolytic dressing, a lens receptacle 36 is forwarded by the cylinder 37, thereby receiving and collecting the lens 38 after finished centering and edging at one surface thereof.

Figure 5G:
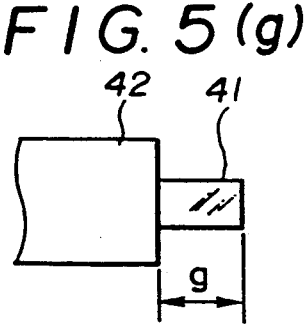
Figure 5H:
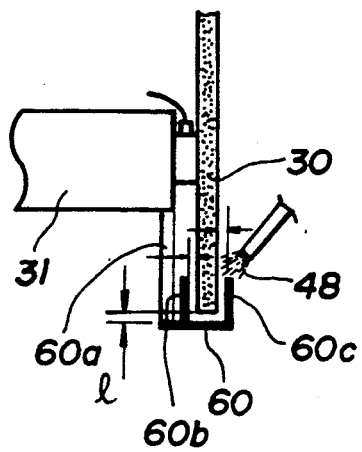
FIG. 5h is an enlarged fragmentary side view showing a modification of the electrode shown in FIGS. 5a and 5c to 5g.

After collecting, the receptacle 36 is returned to its original position, and with respect to this return, as shown in FIG. 5g, the glass stock 41 is fed out by a given amount g while releasing the collet chuck 42 in order to carry out a next or following machining process, and then the next machining process is performed so that a plurality of lenses 38 may be manufactured continuously.

In case of high speed cutting by the straight grinding wheel (38, as shown in FIG. 5h, an electrode 60 comprising electrode portions 60b and 60c with a    shaped section is arranged at the periphery portion of the straight grinding wheel 30. These electrode portions 60b and 60c are located on both sides of the wheel 30 at its peripheral side portion with a gap l, so that in case of feeding weakly conductive coolant 48 between the electrode portions 60b and 60c and both side periphery portions from the pipe 40, both periperal side portions and the periphery surface of the straight grinding wheel 30 may be subjected to the electrolytic dressing effect.

As described above, according to this embodiment, respective machining steps of lens may be carried out by only one machining apparatus, thereby performing lens machining with high efficiency while obtaining electrolytic inprocess dressing effect.

SIXTH EMBODIMENT

Sixth embodiment of the method according to the present invention is explained with respect to FIGS. 6a to 6d, in which parts similar to those previously described with reference to FIGS. 5a to 5g and fifth embodiment are denoted by the same reference numerals and its explanations is omitted.

In this embodiment, the rod shaped glass stock 41 as a raw material is machined to continuously obtain optical components having convex plane by using the machining apparatus for optical components as shown in fifth embodiment and FIG. 5. The machining apparatus is similar to the apparatus shown in FIG. 5b, so that its explanation is omitted. The operation of the method in this embodiment is explained with respect to each machining step shown in FIGS. 6a to 6d.

Figure 6A:
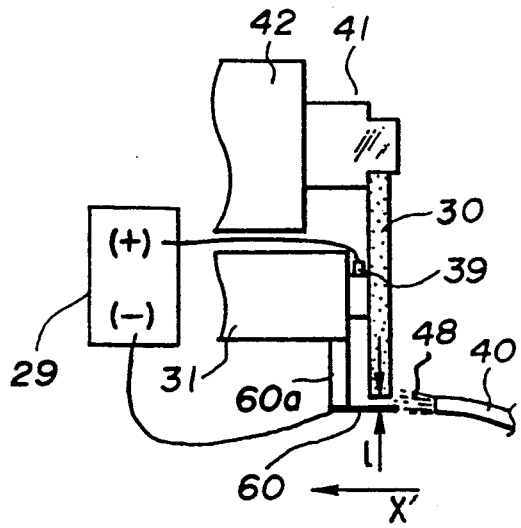
FIGS. 6a to 6g are enlarged fragmatary side views showing the essential portion of a sixth embodiment of the method according to the present invention.

As shown in FIG. 6a, a rod shaped glass stock 41 is held to a spindle 43 of a holding shaft A by a collet chuck 42 and is forwarded on the holding shaft A by a servo motor 45 for moving the spindle 43 to place and hold the glass stock 41 at machining position to a straight grinding wheel 30. At the same time, a corresponding grinding wheel 30 is moved and set at machining positions to the glass stock 41 by manually controlling servo motors 32 and 33 which hold the straight grinding wheel 30.

With respect to setting operation at machining position of the glass stock 41 and the straight grinding wheel 30, the spindle 43 is rotated by a motor 44 and the straight grinding wheel 30 is rotated by the motor 31, so that the glass stock 41 with required diameter is subjected to a round-grinding by the straight grinding wheel 30.

In this case, the program of the machining control corresponding to rounding diameter of the straight grinding wheel 30 may be inputted by a position control section (not shown) for servo motors 32 and 33.

The straight grinding wheel 30 is a conductive grinding wheel formed by sintering abrasive grain such as diamond power, metal powder such as Cu, Sn, Fe or the like and a binder of conductive resin. The anode or positive voltage from an electrolytic supply source 29 is applied to the straight grinding wheel 30 through a feed brush 39 slidably contacted to the rotating shaft, and cathode voltage from the supply source 29 is applied to an electrode 60 which is arranged opposite to the machining surface of the straight grinding wheel 30 with a gap l and then weakly conductive coolant 48 is sprayed between the electrode 60 and the machining surface of the straight grinding wheel 30 from a feed pipe 40, so that the machining surface of the straight grinding wheel 30 may always be subjected to an electrolytic dressing effect during the round-grinding of the glass stock 41 by the straight grinding wheel 30.

Even if an allowance amount for final dimension corresponding to required rounding diameter of the glass stock 41 due to the straight grinding wheel becomes large, the inprocess dressing may be performed, so that high speed machining such as 50 mm/min may be performed with sharp cutting quality.

The round-grinding required for a lens having a plurality of kinds of shape may, therefore, be continuously performed in accordance with the rod length of the glass stock 41.

Figure 6B:
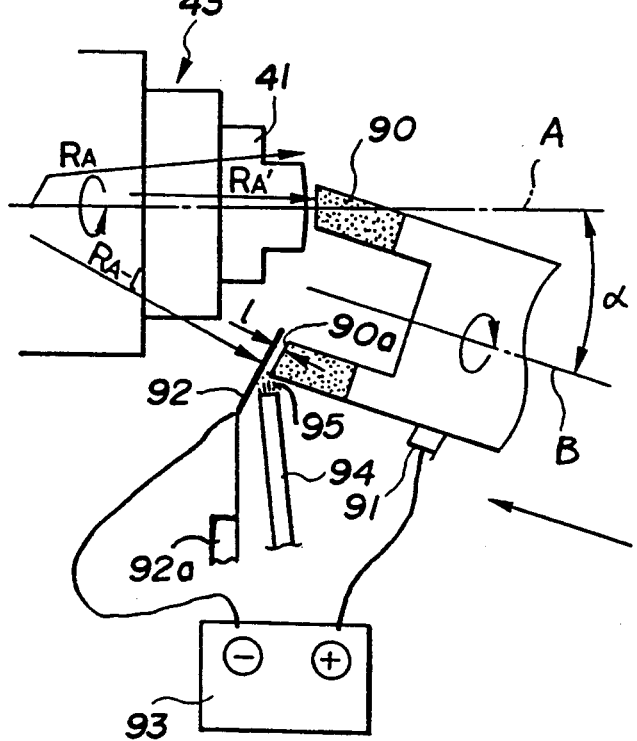

As shown in FIG. 6b, after required round grinding, the conductive CG grinding wheel 90 arranged on a machining shaft B at swivel angle α to a holding shaft A opposite to the glass stock 41 having machined surface of required curvature RA, is forwarded and set at machining position through a servo motor 24.

This movement of the conductive CG grinding wheel 90 is performed with respect to the evacuation or siding action from the machining position of the straight grinding wheel 30.

The conductive CG grinding wheel 90 has a machining surface 90a similar to the machined surface of required curvature RA of the glass stock 41 and this machining surface 90a is made in contact with a surface to be machined of the glass stock 41 and then the conductive CG grinding wheel 90 is rotated by a motor 25 and moved along the notching path, thereby performing curve generation machining to the surface to be machined of the glass stock 41.

Even in the grinding, the machining surface 90a of the conductive CG grinding wheel 90 is subjected to the electrolytic dressing and the grinding surface thereof having desired curvature is always maintained, so that continuous machining of curve generating may be obtained. That is, an anode voltage (pulse voltage) from an electrolytic supply source 93 (for electrolytic machining or discharge machining) is applied to the conductive CG grinding wheel 90 through a feeding brush 91, and an electrode 92 having a shape of curvature RA-1 similar to the curvature RA of machining surface 90a of the conductive CG grinding wheel 90 is arranged a holding arm 92a with a gap l (0.1~0.2 mm) between the electrode 92 and the machining surface 90a of the conductive CG grinding wheel 90, and then the cathode voltage from the supply source 93 is applied to the electrode 92, while weakly conductive coolant 95 is sprayed between the electrode 92 and the machining surface 90a of the CG grinding wheel 90 from a feading pipe 94, so that the machining surface 90a of the grinding wheel 90 is subjected to an electrolytic dressing effect.

Figure 6C:
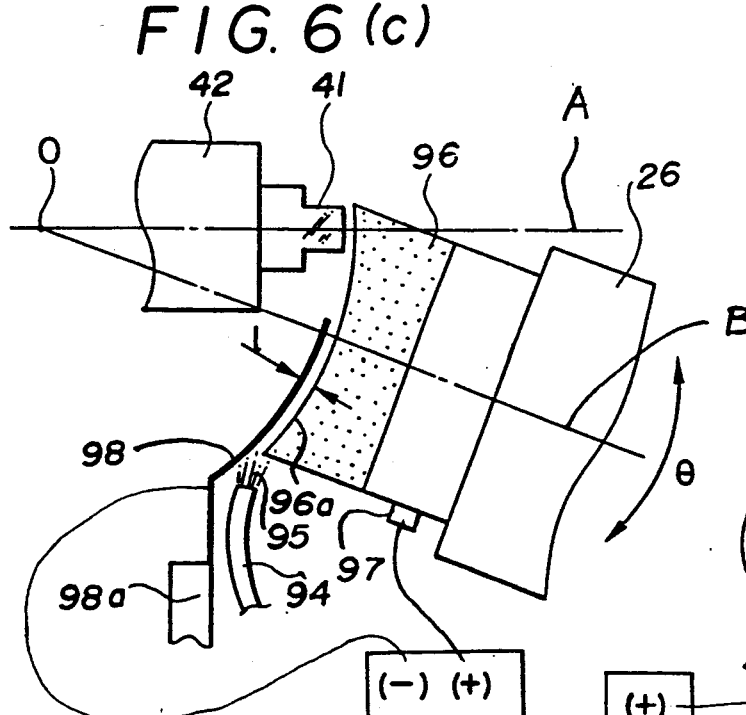

FIG. 6c shows a grinding step of a conductive grinding wheel 96 after grinding machining of curve generating of the glass stock 41 due to the conductive CG grinding wheel 90 shown in FIG. 6b.

That is, the conductive CG grinding wheel 90 is returned to original position from the machining position by the servo motor 24, and the grinding wheel 90 is removed from the spindle 26 and then a conductive grinding wheel 96 is secured to the spindle 26.

The servo motor 24 is again operated to forward the conductive grinding wheel 96 thereby setting it at the machining position to the glass stock 41. At the same time, a motor 25 is operated and the grinding wheel 96 is subjected to a swinging motion in the range of swinging angle θ about a swinging center O by the swivel angle α control section (not shown: see FIG. 5b), thereby grinding the glass stock 41 with grinding surface of the conductive grinding wheel 96.

In the same manner as in the conductive CG grinding wheel 90, the machining surface 96a of the conductive grinding wheel 96 may machine the glass stock 41 having the machined surface with surface roughness of $R_{max} < 0.01$ μm.

That is, as shown in FIG. 6c, the anode voltage from the electrolytic supply source 93 is applied to the conductive grinding wheel 96 through a feeding brush 97, and an electrode 98 having a shape of curvature similar to the curvature of machining surface the conductive grinding wheel 96 is arranged by a holding arm 98a with a gap l between the electrode 98 and the machining surface 96a of the grinding wheel 96, and then the cathode voltage from the electrolytic supply source 93 is applied to the electrode 98, while weakly conductive coolant 95 is sprayed between the electrode 98 and the machining surface 96a of the grinding wheel 96 from the feeding pipe 94, so that the conductive grinding wheel 96 is subjected to an electrolytic dressing effect.

Figure 6D:
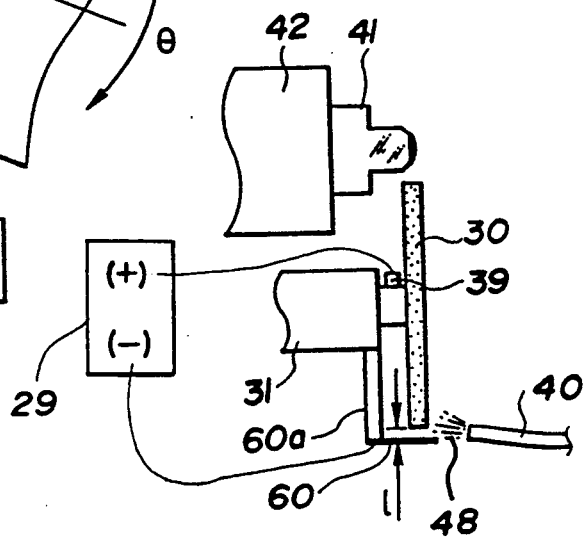

As shown in FIG. 6d, then, 45° chamfering of the glass stock 41 is performed by the straight grinding wheel 30 after the grinding of the glass stock 41 with the conductive grinding wheel 96.

That is, the conductive grinding wheel 96 is returned to its original position from the machining position by the servo motor 24, and with reference to this return the straight grinding wheel 30 is brought to a machining position of the glass stock 41 by servo motors 32 and 33, thereby performing 45° chamfering of the glass stock 41. In this machining, also, the electrolytic dressing effect may be obtained in the same manner as in round grinding shown in FIG. 6a.

Figure 6E:
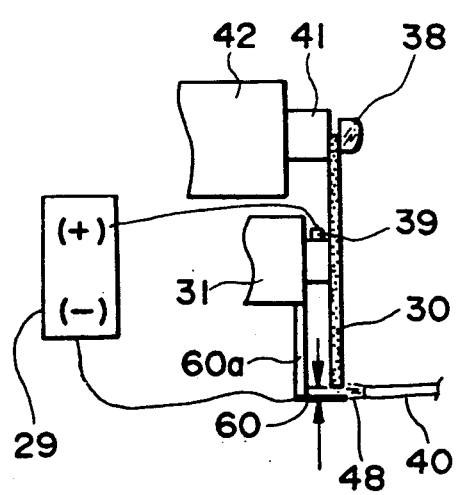

After chamfering, the glass stock 41 is subjected to the high speed cutting together with its machined portion with desired thickness by the straight grinding wheel 30 while effecting electrolytic dressing (see, FIG. 6e).

Figure 6F:
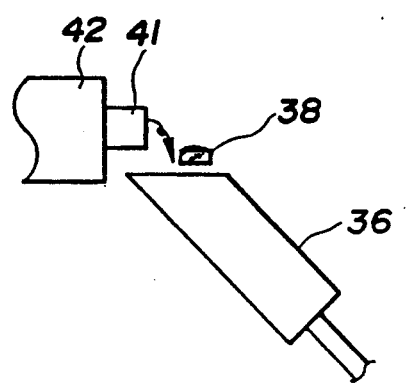
Figure 6G:
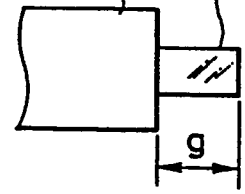

With respect to this cutting, also the cylinder 37 is forwarded and the finished lens 38 is collected in a lens receptacle 36 after cut and machined (see FIG. 6f). Moreover, with respect to this collecting operation, as shown in FIG. 6g, the glass stock 41 is held and set at a position projected by a given amount g by release action of the collet chuck 42, thereby preparing the machining step shown in FIG. 6a. In this case, this preperation work may be carried out in the same manner as in the step shown in FIGS. 5f and 5g, so that continuous machining of the glass stock 41 may be performed by respective machining steps.

As is seen from the above explanation, according to the apparatus for machining optical components in this embodiment stable high speed machining of the glass stock without loading of the machining tool may be obtained by electrolytic inprocess dressing, so that only one machining apparatus having respective machining tools performs a series of machinings from grinding to cutting with high efficiency.

SEVENTH EMBODIMENT

The Seventh embodiment of the method according to the present invention is explained with respect to FIGS. 7a to 7d.

In this embodiment, the surface machining for a glass stock 41 is described. As shown in FIG. 7b, a machining surface 100a of a conductive CG grinding wheel 100 is made a plane surface and as shown in FIG. 7c, a conductive grinding wheel 110 is made of a plane grinding wheel, and thus the grinding wheel 110 is swung at right angles $\theta$ to its rotating shaft.

Figure 7A:
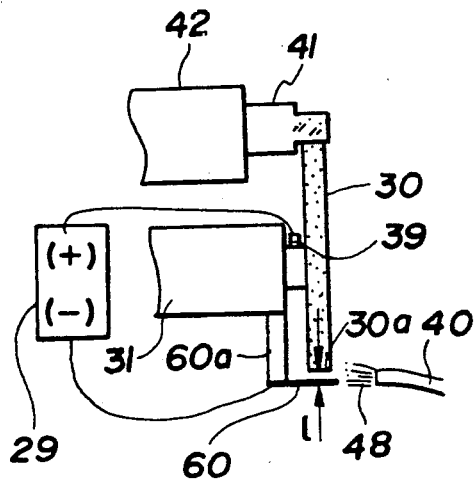
FIGS. 7a to 7d are enlarged fragmentary side views showing the essential portion of a seventh embodiment of the method according to the present invention.
Figure 7B:
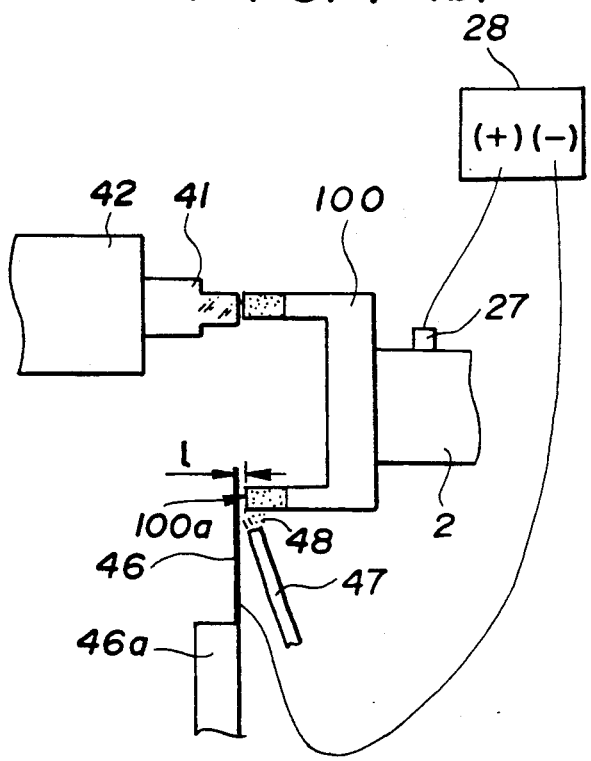
Figure 7C:
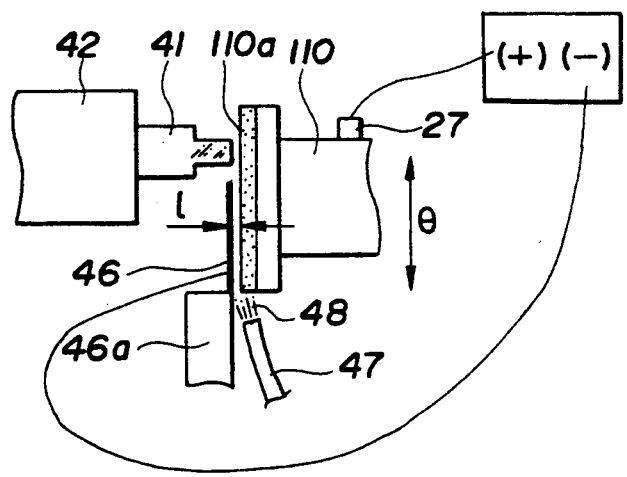
Figure 7D:
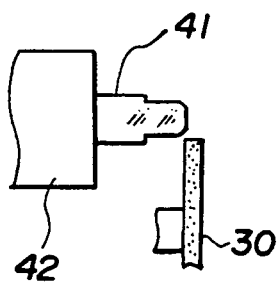

FIG. 7a shows a round grinding step by the straight grinding wheel 30 and FIG. 7d shows a chamfering step by the straight grinding wheel 30.

The high speed cutting after chamfering and completion of one side machining for lens and the collection after cutting as well as the projecting operation of given amount g required to next machining for the glass stock are carried out in the same manner as shown in FIG. 5 and fifth embodiment, and thus respective machining step are performed continuously.

In respective machining step, machining surfaces 30a, 100a, 110a of respective machining tools 30, 100, 110 are subjected to an electrolytic dressing effect in the same manner as in fifth embodiment, so that continuous surface lens machining for the glass 41 may be carried out with high efficiency.

EIGHT EMBODIMENT

The eighth embodiment of the method according to the present invention is explained with respect to FIGS. 8a to 8f.

This embodiment shows the straight grinding wheel 30 is formed integrally with the conductive grinding wheel 110 in the surface grinding shown in seventh embodiment.

Figure 8A:
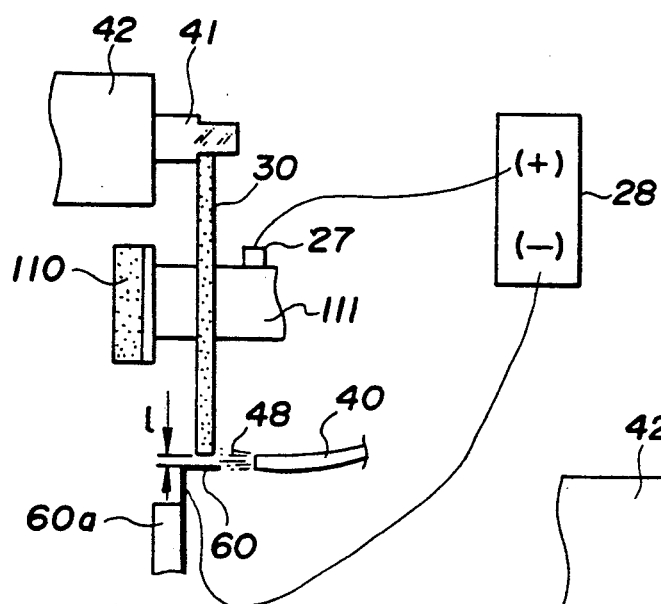
Figure 8B:
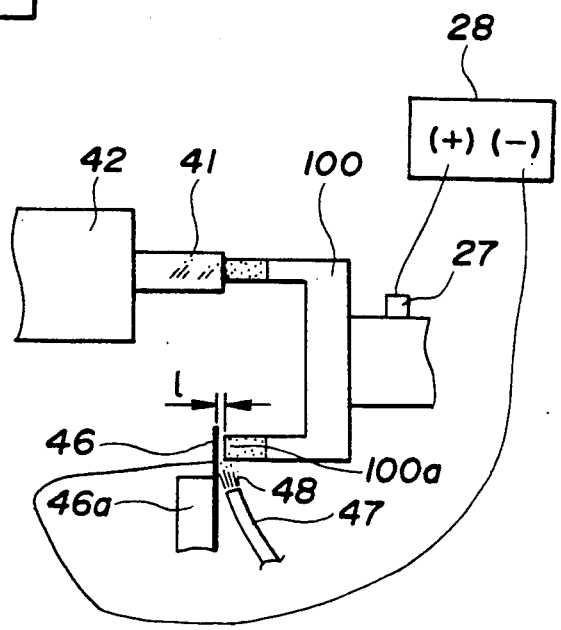

As shown in FIG. 8a, in this embodiment, the straight grinding wheel 30 is secured to a rotating shaft 111 of the conductive grinding wheel 110 shown in seventh embodiment.

Figure 8C:
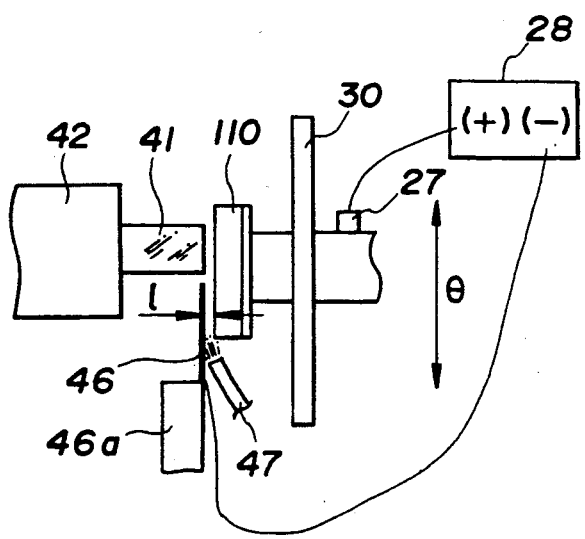

The electrolytic dressing electrode 60 of the straight grinding wheel 30 and the feeding pipe 40 of weakly conductive coolant 48 are, as shown in FIGS. 8a and 8d, (this is omitted in FIG. 8e), arranged at a position required to the machining surface of the straight grinding wheel 30. As shown in FIG. 8c, even in grinding by the conductive grinding wheel 110, an electrode 46 is arranged at required position for the machining surface by a holding arm 46a and weakly conductive coolant 48 is supplied by a feeding pipe 47, thereby performing respective mechinings. The electrolytic supply source 28 and the feeding brush 27 are commonly used for the straight grinding wheel 30 and the grinding wheel 110. A machining shaft B constructed of a spindle 26 operated by a servo motor 24 and a drive motor 25, is arranged opposite to a holding shaft A of the glass stock 41 on a base 57 of the grinder and arranged movably in the opposite direction by the servo motor 24. In addition thereto, the machining shaft B may be swung at right angles $\theta$ to the holding shaft A of the glass stock 41 shown in FIG. 8c by the position control section (not shown). The control required for machining notching amount corresponding to the rounding diameter in the round grinding shown in FIG. 8a, the control required for chamfering shown in FIG. 8d and the control for the machining position of machining surface of the straight grinding wheel 30 and for moving therefrom at returning time, may be controlled by the machining shaft B.

Since the above construction is used instead of the independent straight grinding wheel 30 shown in seventh embodiment, the mounting order of the conduction CG grinding wheel 100 for the machining shaft B and the conductive grinding wheel 110 secured to the straight grinding wheel 30 is different as in seventh embodiment.

The construction and machining step other than the above construction and machining step are the same as in seventh embodiment, so that parts similar to those previously described with reference to FIG. 7 are denoted by the same reference numerals and its explanation is omitted.

NINTH EMBODIMENT

Figure 9:
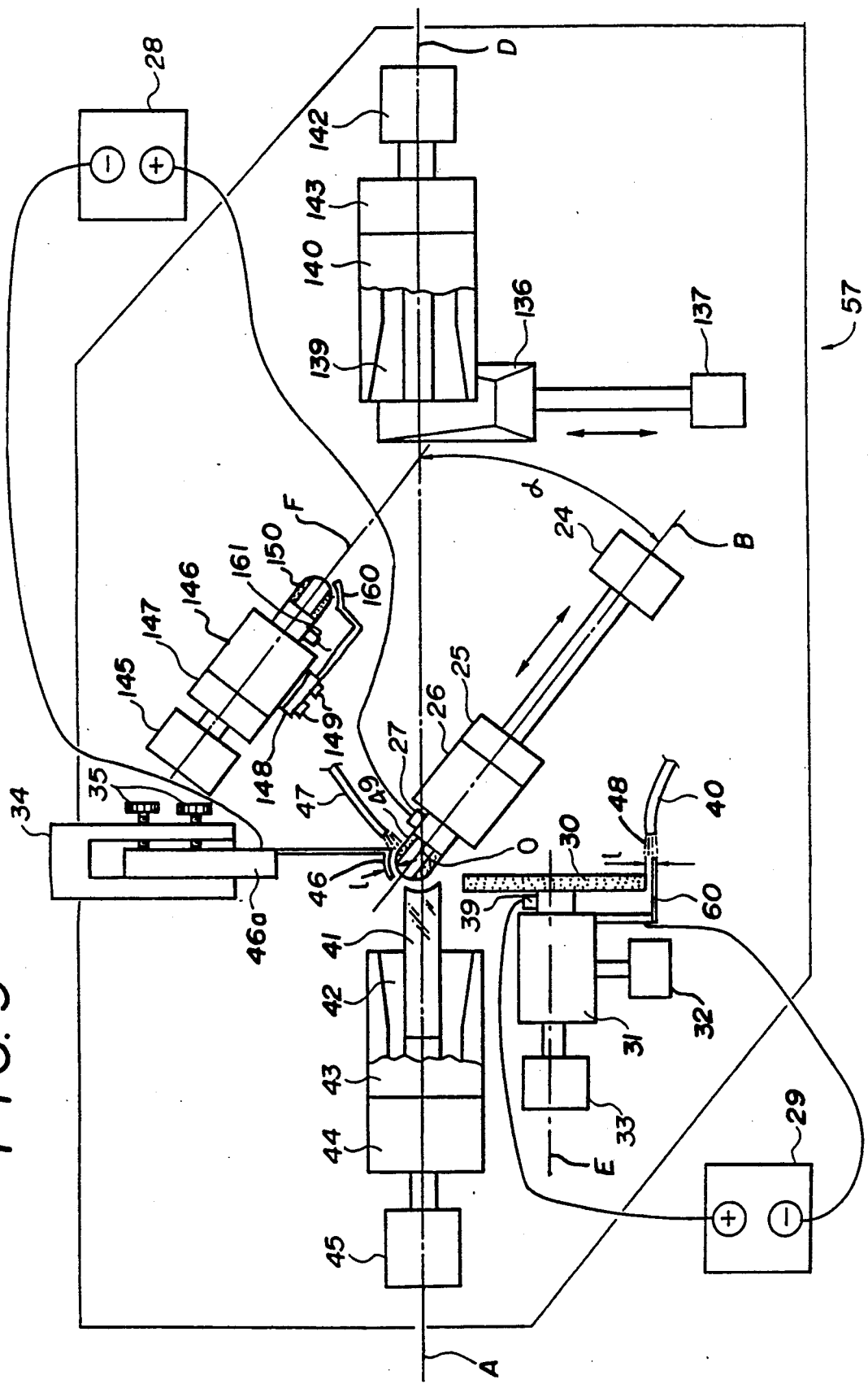
FIGS. 9 is a plan view showing an apparatus carrying out a ninth embodiment of the method according to the present invention.

Ninth embodiment of the method according to the present invention is explained with reference to FIGS. 9 and 10. FIG. 9 shows the machining apparatus and FIGS. 10a to 10g show the machining method.

In this embodiment, as shown in FIGS. 9 and 10a, a rod-shaped glass stock 41 is held by a collet chuck 42 with respect to a spindle 43 which is held rotatably by a motor 44 and movably about a holding shaft A by a servo motor 45.

A second holding shaft D for holding the glass stock after one side machining on the holding shaft A is arranged opposite to the first holding shaft A. That is, the second holding shaft D movably holds a spindle 140 having a collet chuck 139 for holding one side machined stock by a servo motor 142, in the opposite direction.

In this embodiment, the apparatus for machining optical component comprises a holding shaft E for holding a conductive centering and edging, cutting grinding wheel 30 arranged opposite to the first holding shaft A, first machining shaft B for detachably holding the conductive CG grinding wheel 49 and the conductive grinding wheel 501, second machining shaft F for detachable holding the conductive CG grinding wheel 150 and the conductive grinding wheel 151 arranged opposite to the second holding shaft D, a lens receptacle 136 arranged opposite to the second holding shaft D movably through a cylinder 137 and for collecting lens 138 after machined as an optical component on the second machining shaft F, a centering and cutting grinding wheel 30, respective conductive CG grinding wheel 49, 150 on the first and second machining shaft B and F, and electrodes 46, 60, 160 arranged on a base 57 of grinder with a given gap l between the machining surfaces of the conductive grinding wheel 50, 156.

The first and second machining shafts B and F of the conductive CG grinding wheels 49 and 150 as well as the conductive grinding wheels 50, 151 are constructed by loading spindles 26 and 146 as well as rotating drive motors 25 and 147 on the operating shafts of servo motors 24 and 145, and a swivel angle ($\alpha$; not shown) control section holds the conductive CG grinding wheels 49 and 150 as well as the conductive grinding wheels 50 and 151, at any position, thereby machining stock 41.

Electrodes 46, 160 are held by holders 34 and 148 with screws 35 and 149 at a desired gap l between machining surface of the conductive CG grinding wheels 49 and 150 as well the conductive grinding wheels 50, 151 through holding arms 46a 160a, and positive or anode voltage from the electrolytic supply source 28 is applied to the conductive CG grinding wheels 49 and 150 as well as the conductive grinding wheels 50 and 151 through feeding brushes 27 and 161, and the negative or cathode voltage from the electrolytic supply source 28 is applied to the electrodes 46 and 160 as well as the weakly conductive coolant 48 is supplied between the machining surfaces of the conductive CG grinding wheel 49, 150 and the conductive grinding wheel 50, 151 from the feed pipe 47, 162, thereby machining the stock 41 while performing the electrolytic dressing.

A conductive centering and cutting straight wheel 30 is held to the drive shaft of the rotating drive motor 31 and the rotating drive motor 31 is held by servo motors 32 and 33 which operate or move in the orthogonal direction with each other, and is held movably in parallel with and in orthogonal directions to the first holding shaft A of the optical raw stock or material 41. As is not shown in FIG. 9, the movement of the rotatable drive motor 31 by the servo motors 32 and 33 is so constructed that the servo motors 32 and 33 may be operated without interfering with each other. For example, the motor 31 is placed on one of XY tables and this table is moved to the other of XY tables by the servo motor 32, and the other table is moved in the other direction by the servo motor 33.

The electrode 60 is provided to the rotating drive motor 31 through the holding arm 60a with a gap l between the machining surfaces of the centering and cutting grinding wheel 30 and electrode 60, and the anode voltage of the electrolytic supply source 29 is applied to the centering and cutting grinding wheel 30 through the feeding brush 39. Also, the cathode voltage is applied to the electrode 60 and weakly conductive coolant 48 is sprayed between the electrode 60 and the machining surface of the centering and cutting wheel 30 through the pipe 40, so that the electrolytic dressing may be performed during machining of the optical glass raw stock 41 due to the straight grinding wheel 30.

Respective electrodes 46, 60, 160 are formed as the same shape as the machining surface of respective grinding wheels 49, 50, 150, 151.

The method shown in nineth embodiment is explained. As shown in FIG. 9, a rod shaped glass stock 41 is held on the spindle 43 of the first holding shaft A by a collet chuck 42 and moved and set at machining position by the servo motor 45. With respect to this, the conductive CG wheel 49 is made fowarded by the servo motor 24 to the machining position of the glass stock 41, thereby machining the glass stock while controlling the wheel 49 by the swivel angle (α) control portion and swung by θ about a swing center O and the spindle 26 is rotated by a motor 25.

Even during grinding by the conductive CG grinding wheel 49, the machining surface 49a of the CG grinding wheel 49 may be subjected to the electrolytic dressing and the required curvature of the machining surface 49a may be maintained suitably.

As shown in FIG. 10a, the conductive CG grinding wheel 49 held by the spindle 26 in FIG. 9, is removed and the conductive grinding wheel 50 is loaded, so that the swing motion is added in the range of θ about the swinging center O shown in FIG. 10a, through the swivel angle (α), thereby effecting the grinding of the stock. Even in this machining, the machining surface of the conductive grinding wheel 50 in subjected to an electrolytic dressing effect, and required curvature is maintained, so that the grinding of the glass stock 41 may be effected suitably and fairly.

The servo motor 24 is operated. Then, the evacuation of the grinding wheel 50 is effected from the machining position and then the servo motors 32 and 33 are again operated so that the centering and cutting grinding wheel 30 may be maintained at the machining position. Then the chamfering of the glass stock 41 is effected (see FIG. 10b).

In addition to this, as shown in FIG. 10c, the centering and edging of the glass stock is carried out by the centering and cutting grinding wheel 30.

Figure 10D:
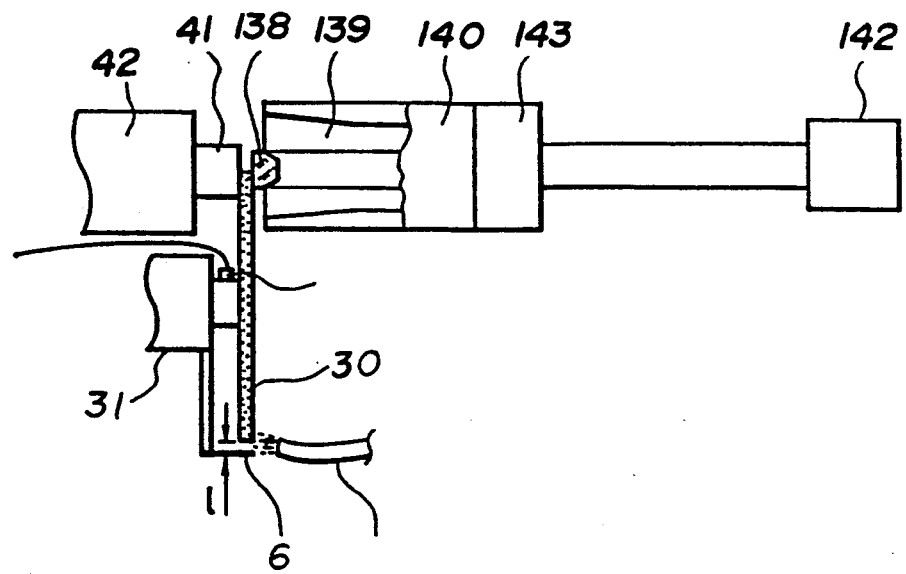

The collet chuck 139 is, then released by the servo motor 142 of the second holding shaft D arranged opposite to the first holding shaft A, and the spindle 140 is forwarded, so that the portion to be machined of the glass stock 41 after centering is chucked by the collet chuck 139 (see FIG. 10d).

After this chucking by the collet chuck 139, the centering and cutting grinding wheel 30 is again operated while effecting the electrolytic dressing of the machining surface of the grinding, wheel 30, thereby performing high speed cutting, and then the machined glass stock 138 at one side on the first machining shaft B is held by the collet chuck 139 on the second holding shaft D.

Figure 10E:
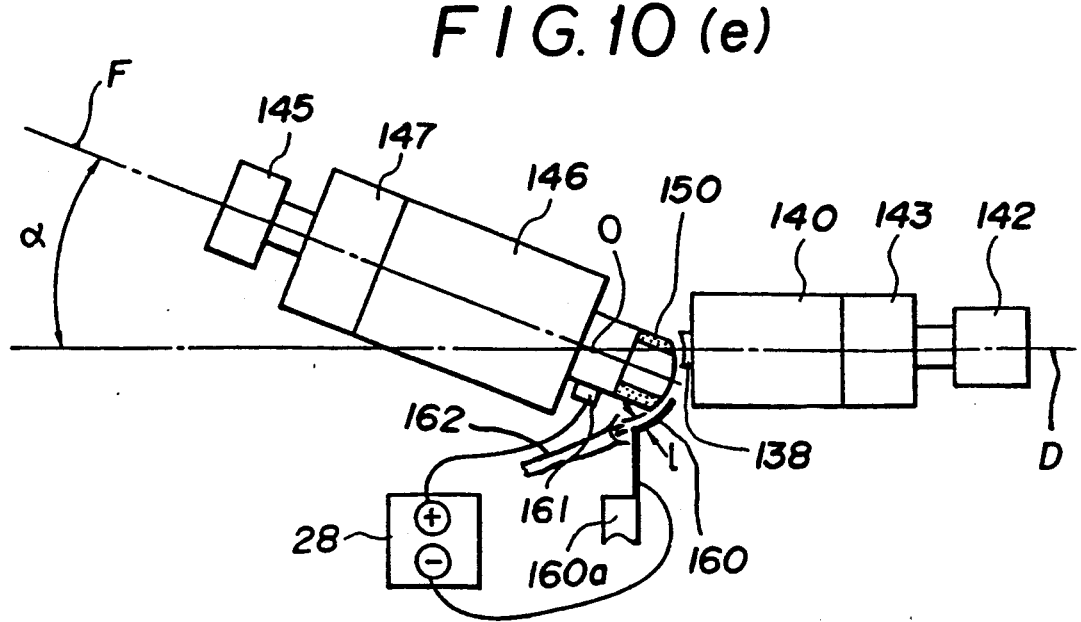

When the glass stock 138 is held by the collet chuck 139, the servo motor 142 is again operated to backward the spindle 140 and with respect to the backward of the spindle 140, the servo motor 145 on the second holding shaft F is operated to make the conductive CG grinding wheel 150 held by the spindle 146 in contact with the other surface of the machining glass stock 138 at one side and held by the collet chuck 139, so that as shown in FIG. 10e, the conductive CG grinding wheel 150 is rotated by the motor 147 and is swung (θ) about the swing center 0 through an angle (α) swinging mechanism (not shown), thereby performing CG (curve generating) of non-machined surface of the glass stock 138.

Figure 10F:
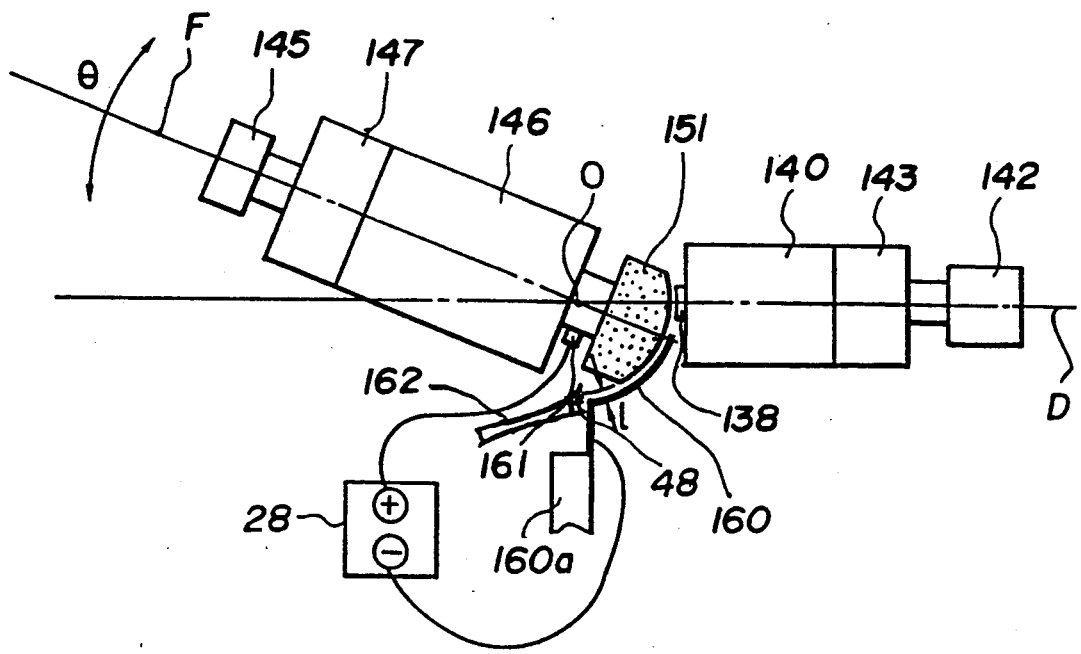

After CG machining, the spindle 146 is once backwarded by the servo motor 145 and then the conductive grinding wheel 151 is held by the spindle 146 instead of the CG grinding wheel 150. The servo motor 145 is then operated to forward the spindle 146 and the grinding wheel 151 is made in contact with the machined surface of the glass stock 138 being CG machined by the CG grinding wheel 150, and then the grinding wheel 151 is rotated by the motor 147, thereby performing the grinding of the glass stock 138 while swinging (θ) about the swinging center O as shown in FIG. 10f.

Figure 10G:
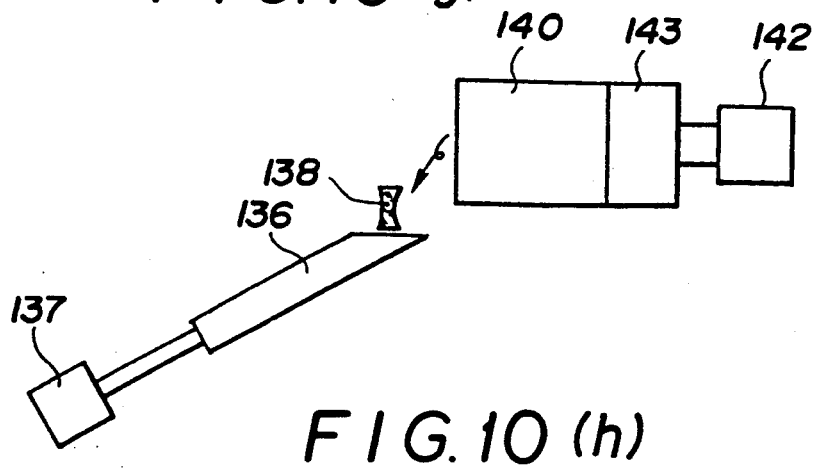

After the finish of grinding by the conductive grinding wheel 151, the spindle 144 is backwarded by the servo motor 145, thereby backwarding the grinding 151 from the machining position and then the lens receptacle 136 is forwarded at the receiving position on the second holding shaft D by the cylinder 137, thereby releasing the holding of machined lens 138 at both sides by the collet chuck 139 of the spindle 140 on the second holding shaft D, and collecting the lens 138 in the lens receptable 36 (see, FIG. 10g).

Figure 10H:
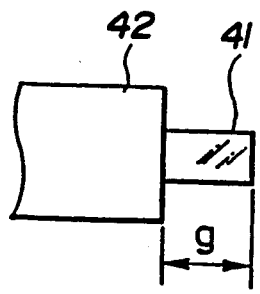

The electrolytic dressing in respective machining steps shown in FIGS. 10h to 10g, is not explained in this embodiment. The anode voltge from the electrolytic supply source 28 is applied to the centering and cutting grinding wheel 30, the conductive CG grinding wheels 49, 150 and the conducting grinding wheels 50, 150 as a machining tool through the feeding brushes 27, 161, and the cathode voltage is applied to the electrodes 46, 60, 160 having the same shape as the grinding wheels 30, 49, 50, 150, 151 arranged opposite to the machining surfaces of respective grinding wheels 30, 49, 50, 150, 151 arranged opposite to the machining surfaces of respective wheels 30, 49, 50, 150, 151 with a gap l, and then the weakly conductive coolant 48 is sprayed between the machining surface of respective grinding wheels 30, 49, 50, 150, 151 and the electrodes 46, 60, 160 from the feeding pipes 40, 47, 162, thereby obtaining electrolytic dressing of respective grinding wheels 30, 49, 50, 150, 151, and performing continuous grinding and polishing which always holds given grinding and polishing curvature and machined surface without loading.

After collecting, the receptacle 36 is returned to its original position, and with respect to this return, as shown in FIG. 10h, the glass stock 41 is fed out by a given amount g while releasing the collet chuck 42 in order to carry out a next or following machining process, and then the next machining process is performed so that a plurality of lenses 38 may be manufacture continuously.

As described above, according to this embodiment, respective machining steps of lens may be carried out by only one machining apparatus, thereby performing lens machining with high efficiency while obtaining electrolytic inprocess dressing effect.

TENTH EMBODIMENT

Tenth embodiment of the method according to the present invention is explained with respect to FIGS. 11a to 11d, in which parts similar to those previously described with reference to FIG. 10a to 10g and ninth embodiment are denoted by the same reference numerals and an explanation thereof is omitted.

In this embodiment, the rod shaped glass stock 41 as a raw material is machined to continuously obtain optical components having a convex plane by using the machining apparatus for optical components as shown in ninth embodiment and FIG. 9. The machining apparatus is similar to the apparatus shown in FIG. 10b, so that its explanation is omitted. The operation of the method in this embodiment is explained with respect to each machining step shown in FIG. 11a to 11d.

Figure 11A:
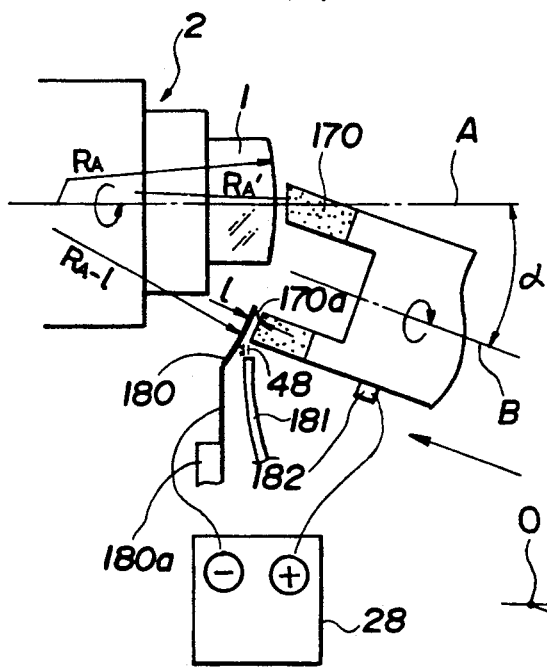
FIGS. 11a to 11d are enlarged fragmentary side views showing the essential portion of a tenth embodiment of the method according to the present invention.
Figure 11B:
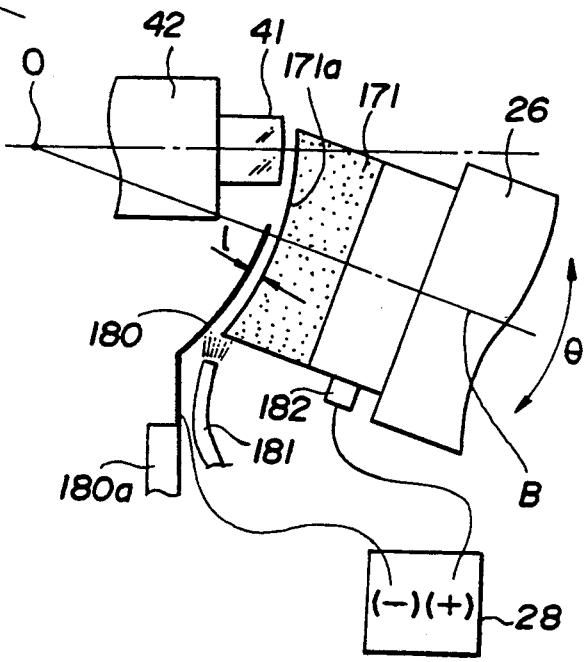

As shown in FIG. 11b, after required round grinding, the conductive CG grinding wheel 170 arranged on a machining shaft B at swivel angle α to a holding shaft A opposite to the glass stock 41 having machined surface of required curvature RA, is forwarded and set at machining position through a servo motor 24.

This movement of the conductive CG grinding wheel 90 is performed with respect to the evacuation or siding action from the machining position of the straight grinding wheel 30.

The conductive CG grinding wheel 170 has a machining surface 170a similar to the machined surface of required curvature RA of the glass stock 41 and this machining surface 170a is made in contact with a surface to be machined of the glass stock 41 and then the conductive CG grinding wheel 170 is rotated by a motor 25 and moved along the notching path, thereby performing curve generation machining to the surface to be machined of the glass stock 41.

Even in the grinding, the machining surface 170a of the conductive CG grinding wheel 170 an alloy by sintering abrasive grain such as diamond powder and metal powder such as Cu, Sn, Fe or the like, which are specially mixed and subjected to a heat treatment, and conductive cup tool is subjected to the electrolytic dressing and the grinding surface thereof having desired curvature is always maintained, so that continuous machining of curve generating may be obtained. That is, an anode voltage (pulse voltage) from an electrolytic supply source 28 (for electrolytic machining or discharge machining) is applied to the conductive CG grinding wheel 170 through a feeding brush 182, and an electrode 180 having a shape of curvature RA-l similar to the curvature RA of machining surface 170a of the conductive CG grinding wheel 170 is arranged a holding arm 180a with a gap l (0.1~0.2 mm) between the electrode 180 and the machining surface 170a of the conductive CG grinding wheel 170, and then the cathode voltage from the supply source 28 is applied to the electrode 180, while weakly conductive coolant 48 is sprayed between the electrode 180 and the machining surface 170a of the CG grinding wheel 170 from a feading pipe 181, so that the machining surface 170a of the grinding wheel 170 is subjected to an electrolytic dressing effect.

FIG. 11b shows a grinding step of a conductive grinding wheel 171 after grinding machining of curve generating of the glass stock 41 due to the conductive CG grinding wheel 170 shown in FIG. 11a.

That is, the conductive CG grinding wheel 170 is returned to original position from the machining position by the servo motor 24, and the grinding wheel 170 is removed from the spindle 26 and then a conductive grinding wheel 171 is secured to the spindle 26.

The servo motor 24 is again operated to forward the conductive grinding wheel 171 thereby setting it at the machining position to the glass stock 41. At the same time, a motor 25 is operated and the grinding wheel 171 is subjected to a swinging motion in the range of swinging angle $\theta$ about a swinging center O by the swivel angle $\alpha$ control section (not shown: see FIG. 9b), thereby grinding the glass stock 41 with grinding surface of the conductive grinding wheel 171.

In the same manner as in the conductive CG grinding wheel 70, the machining surface 171a of the conductive grinding wheel 171 may machine the glass stock 41 having the machined surface with surface roughness of $R_{max} < 0.01$ μm.

Figure 11C:
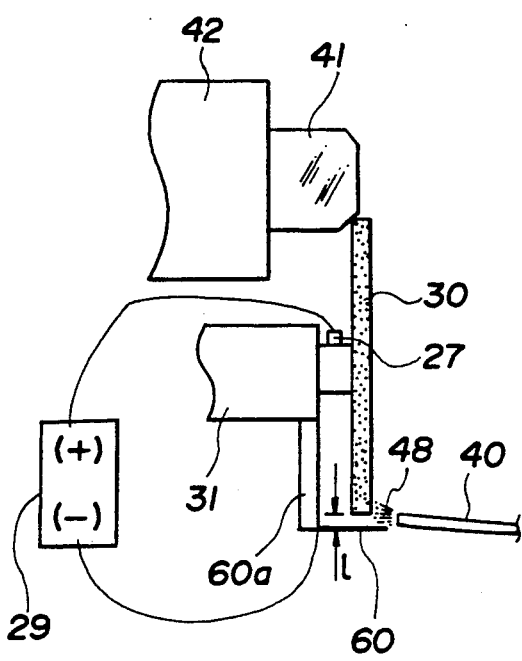
Figure 11D:
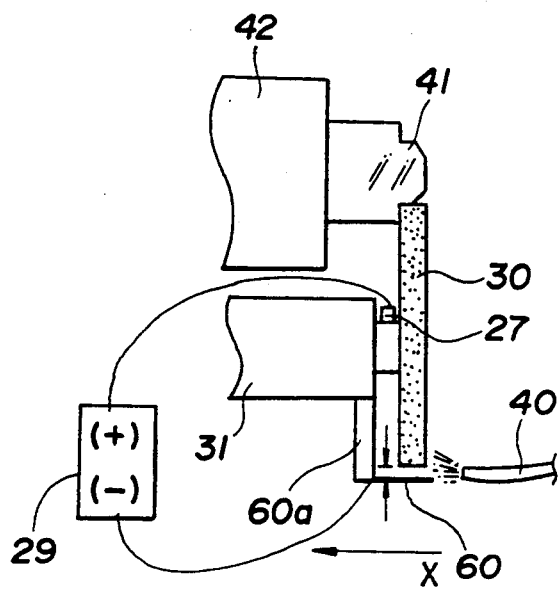

As shown in FIGS. 11c and 11d, then, 45° chamfering of the glass stock 41 is performed by the centering and cutting grinding wheel 30 after the grinding of the glass stock 41 with the conductive grinding wheel 171.

That is, the conductive grinding wheel 171 is returned to its original position from the machining position by the servo motor 24, and with reference to this return the centering and cutting grinding wheel 30 is not st machining position to the glass stock 41 by servo motors 32 and 33, thereby performing 45° chamfering of the glass stock 41 as shown in FIG. 11d. In this machining, also, the electrolytic dressing effect may be obtained in the same manner as in round grinding shown in FIGS. 11c and 11d.

In FIGS. 11a to 11d, high speed cytting is not explained in concretely. Such machining may be carried out by the structure shown in FIG. 10d, so that its explanation is omitted.

As is seen from the above explanation, according to the apparatus for machining optical components in this embodiment, stable high speed machining of the glass stock without loading of the machining tool may be obtained by electrolytic inprocess dressing, so that only one machining apparatus having respective machining tools performed a series of machinings from grinding to cutting with high efficiency.

ELEVENTH EMBODIMENT

Eleventh embodiment of the method according to the present invention is explained with respect to FIGS. 12a to 12d.

Figure 12A:
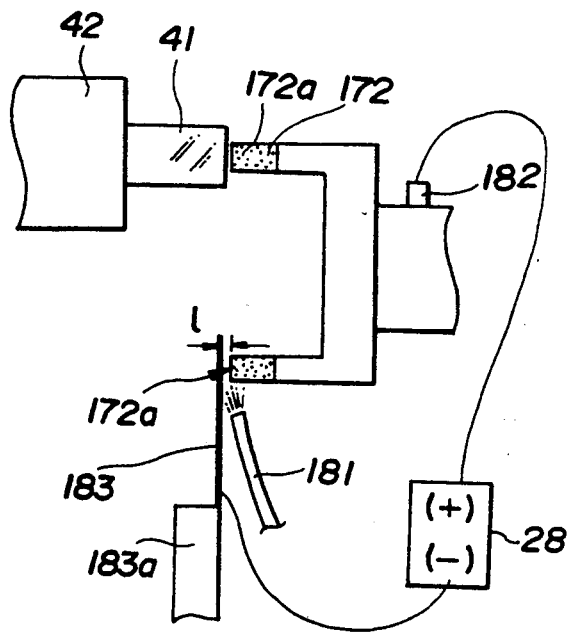
FIGS. 12a to 12d are enlarged fragmentary side views showing the essential portion of an eleventh embodiment of the method according to the present invention.
Figure 12B:
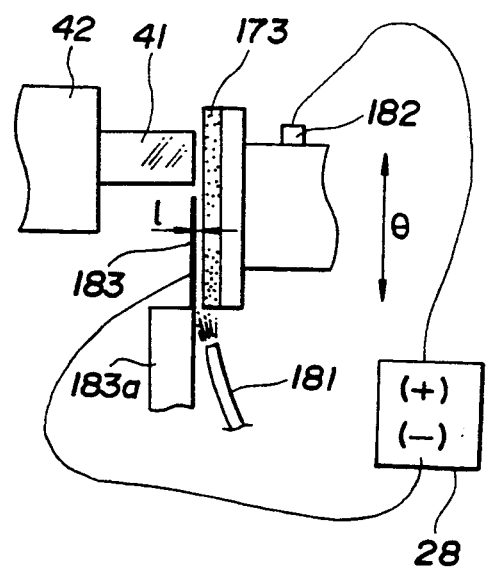

In this embodiment, the surface machining for a glass stock 41 is described. As shown in FIG. 12a, a machining surface 172a of a conductive CG grinding wheel 172 is made a plane surface and as shown in FIG. 12b, a conductive grinding wheel 173 is made of a plane grinding wheel, and thus the grinding wheel 173 is swung at right angles $\theta$ to its rotating shaft.

Figure 12C:
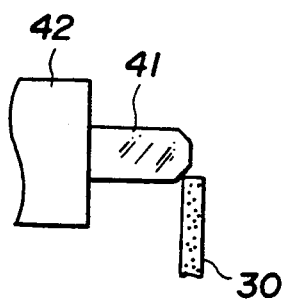
Figure 12D:
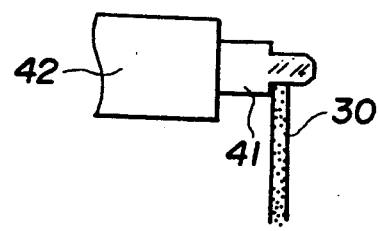

FIG. 12c shows a round grinding step 45° of by the centering and cutting grinding wheel 30 and FIG. 12d shows a centering step by the centering and cutting grinding wheel 30.

The high speed cutting after chamfering and completion of one side machining for lens and the collection after cutting as well as the projecting operation of given amount g required to next machining for the glass stock are carried out in the same manner as shown in FIG. 9 and nineth embodiment, and thus respective machining step are performed continuously.

In respective machining step, machining surfaces of respective machining tools are subjected to an electrolytic dressing effect in the same manner as in ninth embodiment, so that continuous surface lens machining for the glass 41 may be carried out with high efficiency.

TWELFTH EMBODIMENT

Twelfth embodiment of the method according to the present invention is explained with respect to FIGS. 13a to 13d.

This embodiment shows the centering and cutting grinding wheel 30 is formed integrally with the conductive grinding wheel 173 in the surface grinding shown in eleventh embodiment.

As shown in FIG. 12a, in this embodiment, the centering and cutting grinding wheel 30 is secured to a rotating shaft 174 of the conductive grinding wheel 173 shown in eleventh embodiment.

Figure 13A:
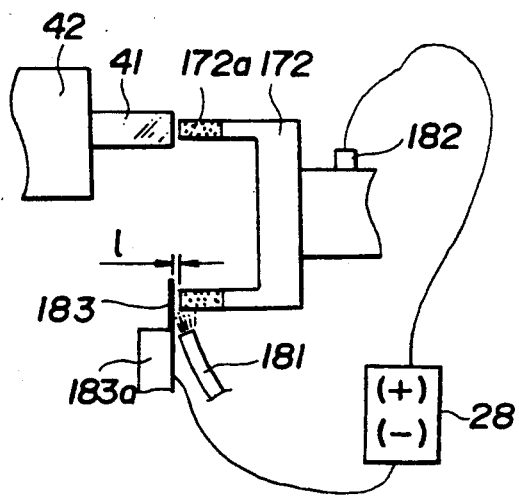
FIGS. 13a to 13d are enlarged fragmentary side views showing the essential portion of a twelfth embodiment of the method according to the present invention.
Figure 13B:
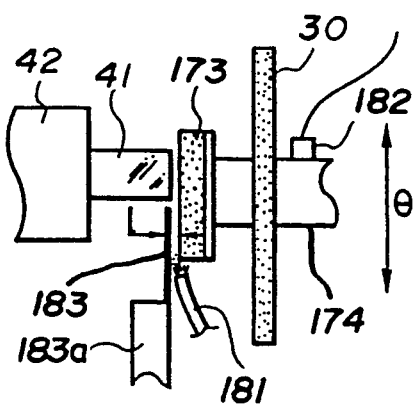
Figure 13C:
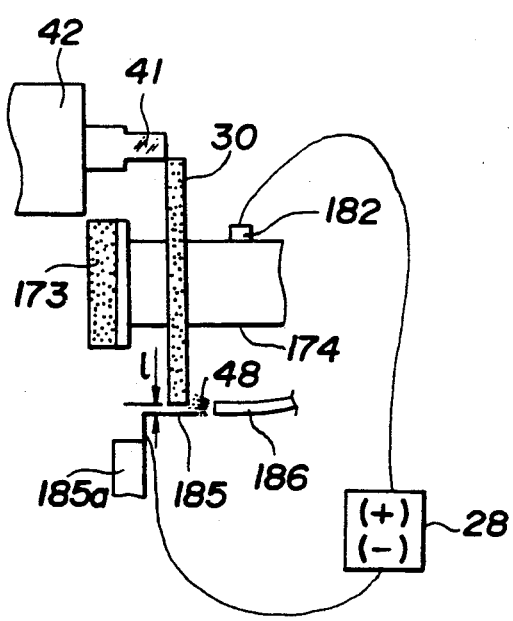
Figure 13D:
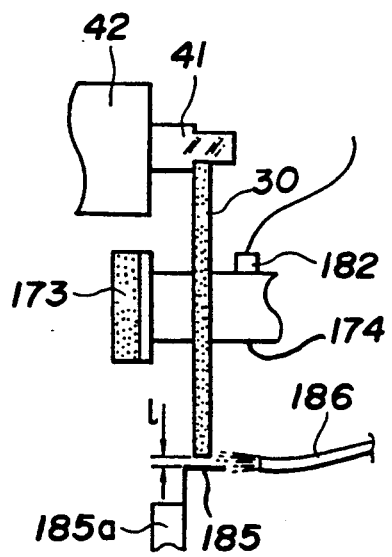
Figure 14:
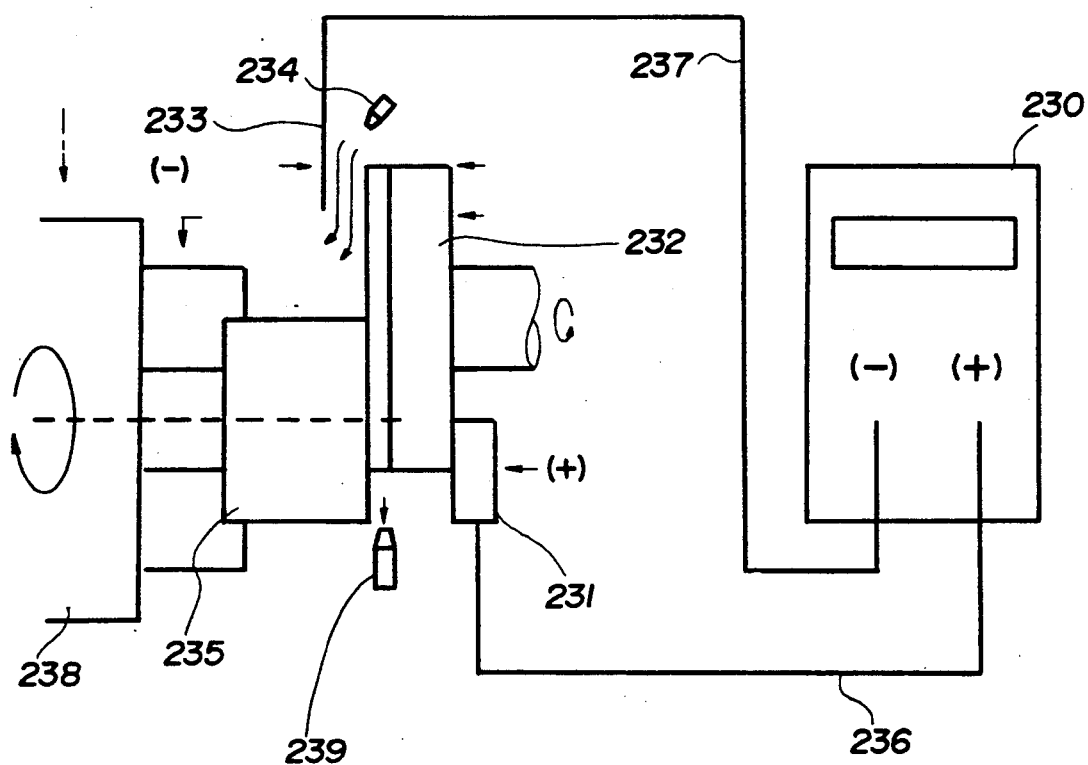
Figure 14:
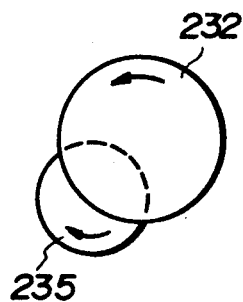

The electrolytic dressing electrode 185 of the centering and cutting grinding wheel 30 and the feeding pipe 186 of weakly conductive coolant 48 are, as shown in FIGS. 13b, 13c and 13d, arranged at a position required to the machining surface of the centering and cutting grinding wheel 30 secured to the rotating shaft 174. As shown in FIG. 13a, even in grinding by the conductive grinding wheel 173, an electrode 183 is arranged at required position for the machining surface by a holding arm 183a and weakly conductive coolant 48 is supplied by a feeding pipe 181, thereby performing respective mechinings. A machining shaft constructed of a spindle 26 operated by a servo motor 24 and a drive motor 25, is arranged opposite to a holding shaft A of the glass stock 41 on a base 57 of the grinder and arranged movably in the opposite direction by the servo motor 24. In addition thereto, the machining shaft may be swung at right angles $\theta$ to the holding shaft A of the glass stock 41 shown in FIG. 13c by the position control section (not shown). The control required for machining notching amount corresponding to the rounding diameter in the round grinding shown in FIG. 13a, the control required for chamfering shown in FIG. FIG. 13c and 13d and the control for the machining position of machining surface of the centering and cutting straight grinding wheel 30 and for moving therefrom at returning time, are may be controlled by the machining shaft B.

The construction and machining step other than the above construction and machining step are the same as in seventh embodiment, so that parts similar to those previously described with reference to FIG. 18 are denoted by the same reference numerals and its explanation is omitted.

In the sixth to eleventh embodiments, in respective step by the straight grinding wheel 30 shown in FIGS. 6a, 6d, 6e, FIGS. 7a, 7d, FIGS. 8a, 8d, FIG. 9, FIGS. 10b, 10c, 10d, FIGS. 11c, 11d, FIGS. 12c, 12d, and FIGS. 13c, 13d, the electrode 60 having electrode portions 60b, 60c shown in FIG. 5h may also be used for the grinding wheel, thereby obtaining the electrolytic dressing effect at the periphery portion of the grinding wheel 30.

What is claimed is:

1. A method of machining optical components comprising the steps of:
    providing an optical raw stock;
    holding the optical raw stock by a rotatable holding shaft; and
    machining the optical raw stock with the use of a machining tool having a machining surface thereof held by rotatable machining shaft and arranged opposite to a surface to be machined of the optical raw stock;
    the improvement comprising the steps of:
    providing an electrically conductive tool as the machining tool;
    arranging an electrode opposite to the machining surface of the conductive tool at a certain distance therefrom and at a position at which the electrode does not interfere with the optical raw stock;
    applying a positive voltage from an electrolytic power supply source to the conductive tool and a negative voltage therefrom to the electrode; and
    applying weakly conductive coolant between the conductive tool and the electrode, while machining the raw stock by touching a surface to be machined with the machining surface of the conductive tool thereby performing the machining of the raw stock and dressing of the conductive tool during rotation of the conductive tool.

2. A method of machining optical components as claimed in claim 1, further comprising the step of moving said electrode relative to said machining surface.

3. A method of machining optical components as claimed in claim 2, including moving the electrode into and out contact with the machining surface during machining.

4. A method of machining optical components as claimed in claim 1, wherein the shape of said electrode corresponds to the shape of the machining surface.

5. A method of machining optical components comprising the step of:

providing an optical raw stock;

holding the optical raw stock by a rotatable holding shaft; and machining the optical raw stock with the use of a machining tool and having a machining surface thereof held by a rotatable machining shaft and arranged opposite to a surface to be machined of the optical raw stock;

the improvement comprising the steps of:

providing a plurality of electrically conductive tools required for the machining of the raw stock as the machining tool;

arranging a plurality of electrodes at a certain distance from the machining surfaces of the respective conductive tools, respectively, the number of the electrodes corresponding to the number of the conductive tools;

applying positive voltages from an electrolytic power supply source to the respective conductive tools and negative voltages therefrom to the respective electrodes, respectively; and applying weakly conductive coolant between the respective conductive tools and the respective electrodes, thereby continuously performing a plurality of kinds of machining of the optical raw stock.

6. A method of machining optical components as claimed in claim 5, wherein the plurality of kinds of machining are of edging, curve generating or surface grinding, curve or surface polishing, chamfering grinding and cutting.

7. A method of machining optical components comprising the step of:

providing an optical raw stock or material;

holding the optical raw stock by a first rotatable holding shaft;

machining one surface to be machined of the optical raw stock with the use of a first machining tool having a machining surface thereof held by a first rotatable machining shaft and arranged opposite to the surface to be machined of the optical raw stock;

holding the machined surface portion of the optical raw stock by a second rotatable holding shaft;

cutting the optical raw stock at an opposite side to the machined surface of the stock; and machining the cut surface of the stock with the use of a second machining tool having a machining surface thereof held by a second rotatable machining shaft and arranged opposite to the cut surface of the stock;

the improvement comprising step of:

providing electrically conductive tools as the machining tools of respective machining shafts, respectively;

arranging electrodes at a certain distance from the machining surface of respective conductive tools, respectively;

applying positive voltages from an electrolytic power supply source to the respective conductive tools and negative voltages therefrom to the respective electrodes, respectively; and applying weakly conductive coolant between the respective conductive tools and the respective electrodes, thereby continuously performing a plurality of kinds of machining of the optical raw stock.

8. A method of machining optical components as claimed in claim 7, wherein the plurality of kinds of machining are curve generating or surface grinding, curve or surface polishing, chamfering grinding and centering, and edging grinding.

9. An apparatus for machining optical components comprising: an optical raw stock, a rotatable holding shaft for holding the optical raw stock, a machining tool having a machining surface thereof held by a rotatable machining shaft and arranged opposite to a surface to be machined of the optical raw stock, characterized by comprising an electrically conductive tool, as the machining tool, said electrically conductive tool provided for contacting the raw stock to machine a surface thereof, an electrode arranged opposite to the machining surface of the conductive tool at a certain distance therefrom and at a position at which the electrode does not interfere with the optical raw stock so as to perform the machining of the raw stock and dressing of the conductive tool during rotation of the conductive tool, an electrolytic power supply source for applying a positive voltage to the conductive tool and a negative voltage to the electrode, and a coolant supplying unit having a nozzle for spraying weakly conductive coolant between the conductive tool and the electrode while performing machining of the optical raw stock.

10. An apparatus for machining optical components as claimed in claim 9, further comprising means for moving said electrode relative to said machining surface.

11. An apparatus for machining optical components as claimed in claim 10, wherein the means for moving comprises means for moving the electrode into contact with the machining surface during machining.

12. An apparatus for machining optical components as claimed in claim 9, wherein the shape of said electrode corresponds to the shape of the machining surface.

13. An apparatus for machining optical components comprising an optical raw stock or material, a rotatable holding shaft for holding the optical raw stock, a machining tool having a machining surface thereof held by a rotatable machining shaft and arranged oposite to a surface to be machined of the optical raw stock, characterized by comprising an electrically conductive tool as the machining tool, a plurality of electrically conductive tools required for the machining of the raw stock as the machining tool, a plurality of electrodes arranged at a certain distance from the machining surfaces of the respective conductive tools, respectively, the number of the electrodes corresponding to the number of the conductive tools, an electrolytic power supply source for applying positive voltages to the respective conductive tools and negative voltages therefrom to the respective electrodes, respectively, and a coolant supplying unit for spraying weakly conductive coolant between the respective conductive tools and the respective electrodes, thereby continuously performing a plurality of kinds of the machining of the optical raw stock.

14. An apparatus for machining optical components comprising an optical raw stock of material, a first rotatable holding shaft for holding the optical raw stock by a first rotatable holding shaft, a first machining tool having a machining surface thereof held by a first rotatable machining shaft and arranged opposite to the surface to be machined of the optical raw stock and for machining one surface to be machined of the optical raw stock, a second rotatable holding shaft for holding the machined surface portion of the optical raw stock, means for cutting the optical raw stock at an opposite side to the machined surface of the stock, a second machining tool having a machining surface thereof held by a second rotatable machining shaft and arranged opposite to the cut surface of the optical raw stock and for machining the cut surface of the stock, characterized by comprising electrically conductive tools as the machining tools of respective machining shafts, respectively, electrodes arranged at a certain distance from the machining surface of respective conductive tools, respectively, an electrolytic power supply source for supplying positive voltages to the respective conductive tools and negative voltages therefrom to the respective electrodes, respectively, and a coolant supplying unit for supplying weakly conductive coolant between the respective conductive tools and the respective electrodes, thereby continuously performing a plurality kinds of machining of the optical raw stock.

15. A method of machining optical components comprising steps of:

providing an optical raw stock to be machined;

holding the optical raw stock by a rotatable holding shaft; and machining the optical raw stock with the use of a machining tool having a machining surface thereof held by a rotatable machining shaft and arranged opposite to a surface to be machined of the optical raw stock;

the improvement comprising the steps of:

providing a cup-shaped electrically conductive tool as the machining tool in such a manner that the machining shaft intersects with the holding shaft;

arranging an electrode at a certain distance form the machining surface of the conductive tool so as to perform the machining of the raw stock and a dressing of the conductive tool, alternately, during rotation of the conductive tool;

applying a positive volatge to the conductive tool and negative voltage to the electrode; and applying weakly conductive coolant between the conductive tool and the electrode to effect machining of the raw stock and dressing of the conductive tool.

16. An apparatus for machining an optical raw stock comprising: a rotatable holding shaft for holding the optical raw stock, a machining tool having a machining surface thereof held by a rotatable machining shaft and arranged opposite to a surface to be machined of the optical raw stock, wherein the machining tool comprises a cup-shaped electrically conductive tool mounted in such a manner that the machining shaft insersects with the holding shaft, an electrode arranged at a certain distance from the machining surface of the conductive tool thereby enabling both machining of the raw stock and dressing of the conductive tool, alternately, during rotation of the conductive tool, an electrolytic power supply source for applying a positive voltage to the conductive tool and a negative voltage to the electrode, and a coolant supplying unit having a nozzle for supplying weakly conductive coolant between the conductive tool and the electrode to effect machining of the optical raw stock and dressing of the conductive tool.

* * * * *